(12) United States Patent
Kadono et al.

(10) Patent No.: US 8,213,495 B2
(45) Date of Patent: Jul. 3, 2012

(54) PICTURE DECODING METHOD AND PICTURE DECODING APPARATUS

(75) Inventors: Shinya Kadono, Hyogo (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 1553 days.

(21) Appl. No.: 11/700,112

(22) Filed: Jan. 31, 2007

(65) Prior Publication Data

US 2007/0183496 A1 Aug. 9, 2007

(30) Foreign Application Priority Data

Feb. 6, 2006 (JP) ................. 2006-029051

(51) Int. Cl.
*G06F 21/00* (2006.01)
(52) U.S. Cl. ............. 375/240; 705/51; 705/52; 705/53; 705/54; 709/229; 455/433; 455/455
(58) Field of Classification Search .................. 375/240
See application file for complete search history.

(56) References Cited

U.S. PATENT DOCUMENTS

| 5,715,008 A * | 2/1998 | Sekiguchi et al. ....... 375/240.15 |
| 7,460,596 B2 * | 12/2008 | Kwon et al. ............. 375/240.03 |
| 2004/0076237 A1 * | 4/2004 | Kadono et al. .......... 375/240.29 |
| 2005/0157800 A1 | 7/2005 | Kim |
| 2005/0243911 A1 * | 11/2005 | Kwon et al. ............. 375/240.03 |
| 2006/0051068 A1 | 3/2006 | Gomila |

FOREIGN PATENT DOCUMENTS

| JP | 5-153574 | 6/1993 |
| JP | 6-189284 | 7/1994 |
| JP | 9-247681 | 9/1997 |
| JP | 2003-032686 | 1/2003 |
| JP | 2006-196970 | 7/2006 |
| WO | 2004/064396 | 7/2004 |
| WO | 2005/069627 | 7/2005 |

OTHER PUBLICATIONS http://ip.hhi.de/imagecom_G1/assets/pdfs/csvt_overview_0305.pdf|Overview of the H.264/AVC Video Coding Standard|ThomasWiegand, Gary J. Sullivan|vol. 13, No. 7, Jul. 2003|pp. 1-17.*

* cited by examiner

*Primary Examiner* — Taghi Arani
*Assistant Examiner* — Mahfuzur Rahman
(74) *Attorney, Agent, or Firm* — Wenderoth, Lind & Ponack, L.L.P.

(57) ABSTRACT

Provided is a picture decoding method in which a less degraded decoded picture can be reconstructed even if an error has occurred. A picture decoding method for decoding coded data on a block-by-block basis and smoothing, using a deblocking filter, blocking distortion which occurs in a boundary between decoded blocks. In this method, a variable length decoding unit VLD detects whether or not each block in the coded data contains an error; and a deblocking filter DBF determines, based on the result of the detection, (i) whether or not filtering should be performed on a boundary between two adjacent blocks, and (ii) which one of deblocking filters with different smoothing levels should be used for filtering of the boundary.

7 Claims, 20 Drawing Sheets

FIG. 2

| | At least one of adjacent blocks is intra coded | Coefficients of at least one of adjacent blocks are coded | Adjacent blocks are different in their motion information |
|---|---|---|---|
| Filter 0 | YES | | |
| Filter 1 | NO | YES | |
| Filter 2 | NO | NO | YES |
| Filter 3 | NO | NO | NO |

PICTURE DECODING METHOD AND PICTURE DECODING APPARATUS

BACKGROUND OF THE INVENTION (1) Field of the Invention

The present invention relates to a picture decoding method for properly decoding coded data containing an error.

(2) Description of the Related Art

Recently, with the advent of the age of multimedia which handles audio, pictures and other pixel values in an integrated manner, existing information media, such as newspapers, journals, TVs, radios and telephones and other means, through which information is carried to people, have come under the scope of multimedia. Generally speaking, multimedia refers to a representation in which not only text but also graphics, audio, particularly pictures, and the like are simultaneously linked together. However, the information for the above existing information media must first be digitized before it can be handled as multimedia information.

However, the estimated storage capacity required to store the information carried by each of the above information media when it is converted to digital data is only 1 or 2 bytes per character for text, but 64 Kbits for one second of (telephone quality) audio, and 100 Mbits for one second of video (at current television receiver quality). It is therefore not practical to handle these massive amounts of information in digital form on the above information media. For example, video telephony service is available over Integrated Services Digital Network (ISDN) lines with a transmission speed of 64 Kbit/s to 1.5 Mbit/s, but television camera grade video cannot be sent as it is over the ISDN lines.

Data compression therefore becomes essential. Video telephony service, for example, is implemented using video compression techniques internationally standardized in International Telecommunication Union, Telecommunication Standardization Sector (ITU-T) Recommendations H.261 and H.263. Using the data compression techniques defined in MPEG-1, video information can be recorded together with audio information on a conventional audio compact disc (CD).

The Moving Picture Experts Group (MPEG) is an international standard for compressing moving picture (video) signals. MPEG-1 is a standard that enables compression of a video signal to 1.5 Mbps, that is, compression of information in a television signal approximately to a hundred times less (1:100) than the original size. The medium picture quality is targeted in the MPEG-1 because the transmission speed for MPEG-1 video is limited to approximately 1.5 Mbit/s. Therefore, MPEG-2, which was standardized to meet the demand for even higher picture quality, enables compression of a moving picture signal to 2 Mbit/s to 15 Mbit/s. Furthermore, MPEG-4 with an even higher compression rate has also been standardized by the working group (ISO/IEC ITC1/SC29/WG11) that has advanced the standardization of MPEG-1 and MPEG-2. MPEG-4 not only enables coding, decoding and operations on a per-object basis, it also introduces a new capability required in the multimedia age. At first, MPEG-4 was developed for the purpose of the standardization of a coding method for a low bit rate. However, it has been extended to a more versatile coding method including coding of interlaced pictures. MPEG-4 AVC and ITU-T H.264 have been standardized as a next generation coding method with a higher compression rate from a collaboration of ISO/IEC and ITU-T.

In coding of a moving picture, information is usually compressed by removing spatial and temporal redundancies. Therefore, inter-picture prediction coding, which aims at reducing the temporal redundancy, estimates motions and generates a predicted image on a block-by-block basis with reference to forward and backward pictures, and then encodes a differential value between the obtained predicted picture and a current picture to be coded. Here, a "picture" is a term to represent a single picture and it represents a "frame" when used for a progressive picture whereas it represents a "frame" or a "field" when used for an interlaced picture. The interlaced picture here is a picture in which a single frame consists of two fields having different times. For coding and decoding an interlaced picture, a single frame can be handled as a frame, as two fields, or as a frame or as two fields while switching between a frame structure and a field structure on a block-by-block basis in the frame.

A picture on which intra-picture prediction coding is performed without referring to any picture is called an I-picture. A picture on which inter-picture prediction coding is performed by referring to only one picture is called a P-picture. A picture on which inter-picture prediction coding is performed by referring to two pictures is called a B-picture. A B-picture can refer to two pictures in two directions. These two pictures can be selected from an arbitrary combination of forward and/or backward pictures in display order. Reference pictures can be specified for each block which is a basic unit for coding and decoding, but they are distinguished as the first reference picture for a reference picture that is described first in coded data and as the second reference picture for a reference picture that is described later. However, in order to use pictures as reference pictures for coding or decoding these I, P and B pictures, the reference pictures need to be already coded or decoded.

A motion compensation inter-picture prediction coding is employed for coding P-pictures and B-pictures. Motion compensation inter-picture prediction coding is a coding method applying motion compensation to inter-picture prediction coding. Motion compensation is not a scheme to simply generate a predicted picture using pixel values of a reference picture. It is a scheme for improving prediction accuracy and reducing data amount by estimating a motion amount (to be referred to as a "motion vector" hereinafter) of each part within a picture to make prediction in consideration of the motion vector. For example, data amount is reduced by estimating a motion vector for a current picture to be coded and coding a prediction residual between the current picture and a predicted picture obtained by shifting a reference picture by the amount equivalent to the motion vector. In the case of using this scheme, since the motion vector information is needed for decoding, the motion vector is also coded and then recorded or transmitted (see, for example, Japanese Laid-Open Patent Application No. 05-153574 and Japanese Laid-Open Patent Application No. 06-189284).

FIG. 1 is a block diagram showing a structure of a picture decoding apparatus using a conventional picture decoding method.

Coded data Str is decoded by a variable length decoding unit VLD, and error information err, motion information mv, a coding mode mode and a prediction error coeff are outputted. The error information err is information that indicates whether or not each block in the coded data Str contains an error. The motion information mv is information necessary for inter-picture motion compensation and contains information that indicates a motion vector and a picture referred to for inter-picture motion compensation. The coding mode mode is information that indicates whether a block has been intra coded or inter coded. The prediction error coeff is a coded prediction error in intra-picture or inter-picture prediction and is information that indicates the size of the prediction error.

An inverse quantization unit IQ performs inverse quantization on the prediction error coeff and outputs the inversely quantized error to the inverse orthogonal transformation unit IT. The inverse orthogonal transformation unit IT performs inverse orthogonal transformation on the error and outputs the resulting data to the addition unit Add.

When the block is inter coded, a motion compensation unit MC performs motion compensation, based on the information indicated by the motion information mv, on the pixel values of a reference picture outputted from a picture memory PM, and outputs the resulting data to a switch Sel1.

When the block is intra coded, an intra-picture prediction unit IP performs intra-picture prediction of the output from an addition unit Add and outputs the resulting data to the switch Sel1.

The switch Sel1 selects the output from the intra-picture prediction unit IP if the coding mode mode indicates intra-picture coding, and it selects the output from the motion compensation unit MC if the coding mode mode indicates inter-picture coding.

The addition unit Add adds the output of the inverse orthogonal transformation unit IT and the output of the switch Sel1. The output of the addition unit Add is the decoded pixel values to which a deblocking filter has not yet been applied, and is used as reference pixel values for intra-picture prediction performed by the intra-picture prediction unit IP.

The deblocking filter DBF applies deblocking filtering on the output from the addition unit Add by referring to the motion information mv, the coding mode mode and the prediction error coeff, so as to remove blocking distortion and generate a decoded picture Vout.

In the case where the error information err indicates that there is no error in a block, the decoded picture Vout is stored as it is into the picture memory PM. In the case where the error information err indicates that there is an error in a block, an error-concealed pixel block generated, by the error concealment unit EC, from a decoded picture stored in the picture memory PM, instead of the decoded pixel values of the block, is stored into the picture memory PM.

The output from the picture memory PM is used as reference pixel values for the motion compensation unit MC when the next picture is decoded.

FIG. 2 shows an example of a method for selecting a deblocking filter. There are four types of filters from a filter 0 to a filter 3. The filter 0 has the highest smoothing level, the filter 1 has the next highest smoothing level, and the filters 2 and 3 have respective smoothing levels in descending order.

More specifically, since blocking distortion is more obvious in an intra coded block than an inter coded block, the filter 0 with the highest smoothing level is applied to the boundary between two adjacent blocks when at least one of the blocks has been intra coded. Next, since blocking distortion is more obvious in a block that contains an inter-picture prediction error than a block that contains no inter-picture prediction error, the filter 1 with the rather higher smoothing level is applied when at least one of the adjacent blocks contains an inter-picture prediction error (namely, the coded coefficients of that block are included in the coded data). Furthermore, since blocking distortion is obvious when two adjacent blocks are different from each other in their motion information mv (such as motion vectors), the filter 2 with the rather low smoothing level is applied. When the motion information mv of the two adjacent blocks is identical, the filter 3 with the lowest smoothing level is applied. Note that the use of the filter 3 includes no application of a deblocking filter.

As mentioned above, the filter 0, the filter 1, the filter 2 and the filter 3 can be switched depending on the degree to which blocking distortion is obvious.

FIG. 3 is a flowchart showing deblocking filters to be selected in the conventional picture coding method, and shows an implementation example of the method for selecting one of the deblocking filters shown in FIG. 2.

In Step 10, it is judged whether or not at least one of two consecutive blocks has been intra coded (using the information of the coding mode mode). When at least one of the blocks has been intra coded, deblocking filtering is performed using the filter 0 in Step 15, and then the process is ended. When both the blocks have been inter coded, a judgment is made in Step 11.

In Step 11, it is judged whether or not the coefficients of at least one of the blocks have been coded (using the information of the prediction error coeff). When the coefficients of at least one of the blocks have been coded, deblocking filtering is performed using the filter 1 in Step 16, and then the process is ended. When the coefficients of neither block have been coded, a judgment is made in Step 12.

In Step 12, it is judged whether or not the motion information of these blocks is different from each other (using the information of the motion information mv). When the motion information of one block is different from that of the other block, deblocking filtering is performed using the filter 2 in Step 17, and then the process is ended. When this is not the case (i.e., when the motion information of one block is identical to that of the other block), deblocking filtering is performed using the filter 3 in Step 18, and then the process is ended.

FIG. 4 is a diagram for explaining one example of error concealment for concealing pixel values of a block that contains an error. The pixel values of a block 171 which cannot be properly decoded due to an error in a target decoded picture are replaced with the pixel values of a block 172 which is co-located in a reference picture referred to for inter-picture prediction. Such generation of pixel values of a block that contains an error using replacement or the like, as shown in this example, is called "error concealment".

FIG. 5 is a block diagram showing a structure of another picture decoding apparatus using a conventional picture decoding method. Since some of the processing units in the block diagram of the conventional picture decoding apparatus in FIG. 5 operate in the same manner as those in the block diagram of the conventional picture decoding apparatus in FIG. 1, the identical reference numbers are assigned to such processing units and a description thereof is not repeated here.

In FIG. 1, the variable length decoding unit VLD detects error information err from coded data Str. However, in some types of applications or implementations of devices, the error information err can be obtained, not from the coded data Str but from a device which receives the coded data Str. In such a case, the error information err is given from outside, as shown in FIG. 5.

However, any conventional picture decoding methods using deblocking filters do not disclose what kind of decblocking filter should be used for a block that contains an error. As for a block in which an error has occurred, how blocking distortion looks like should vary depending on the error. Therefore, even if an error occurs, a less degraded decoded picture should be able to be reconstructed by switching a deblocking filter adaptively.

SUMMARY OF THE INVENTION

The present invention has been conceived in view of the above circumstances, and therefore has an object to provide a picture decoding method which allows reconstruction of a less degraded decoded picture even if an error occurs.

In order to achieve the above object, the picture decoding method of the present invention is a picture decoding method for decoding coded data on a block-by-block basis and smoothing, using a deblocking filter, blocking distortion which occurs in a boundary between decoded blocks. This method includes: detecting whether or not each block in the coded data contains an error; and determining, based on a result of the detecting, (i) whether or not filtering should be performed on a boundary between two adjacent blocks, and (ii) which one of deblocking filters with different smoothing levels should be used for filtering of the boundary.

By this method, it is possible to reconstruct a less degraded decoded picture even if an error occurs.

The above-mentioned determining may include determining that filtering should be performed on a boundary between a block that contains an error and a block adjacent to the block, using a deblocking filter with a highest smoothing level.

The above-mentioned picture decoding method may further include decoding an inter-picture coded block in the coded data using, as a reference picture, a picture in which the filtering determined in the above determining has been applied to all boundaries between blocks.

Note that it is possible to implement the present invention not only as such a picture decoding method, but also as a picture decoding apparatus including, as units, the characteristic steps of this picture decoding method, as well as a program for causing a computer to execute these steps. Furthermore, such a program can be distributed by recording media including CD-ROM and over transmission media including the Internet.

As mentioned above, according to the present invention, even if an error occurs, it is possible to reconstruct a less degraded decoded picture by switching a deblocking filter adaptively. Therefore, the practical value of the present invention is high.

FURTHER INFORMATION ABOUT TECHNICAL BACKGROUND TO THIS APPLICATION

The disclosure of Japanese Patent Application No. 2006-029051 filed on Feb. 6, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 shows an example of a method for selecting a deblocking filter;

DESCRIPTION OF THE PREFERRED EMBODIMENTS

Hereafter, the embodiments of the present invention will be described with reference to FIGS. 6 to 20.

First Embodiment

Figure 1:
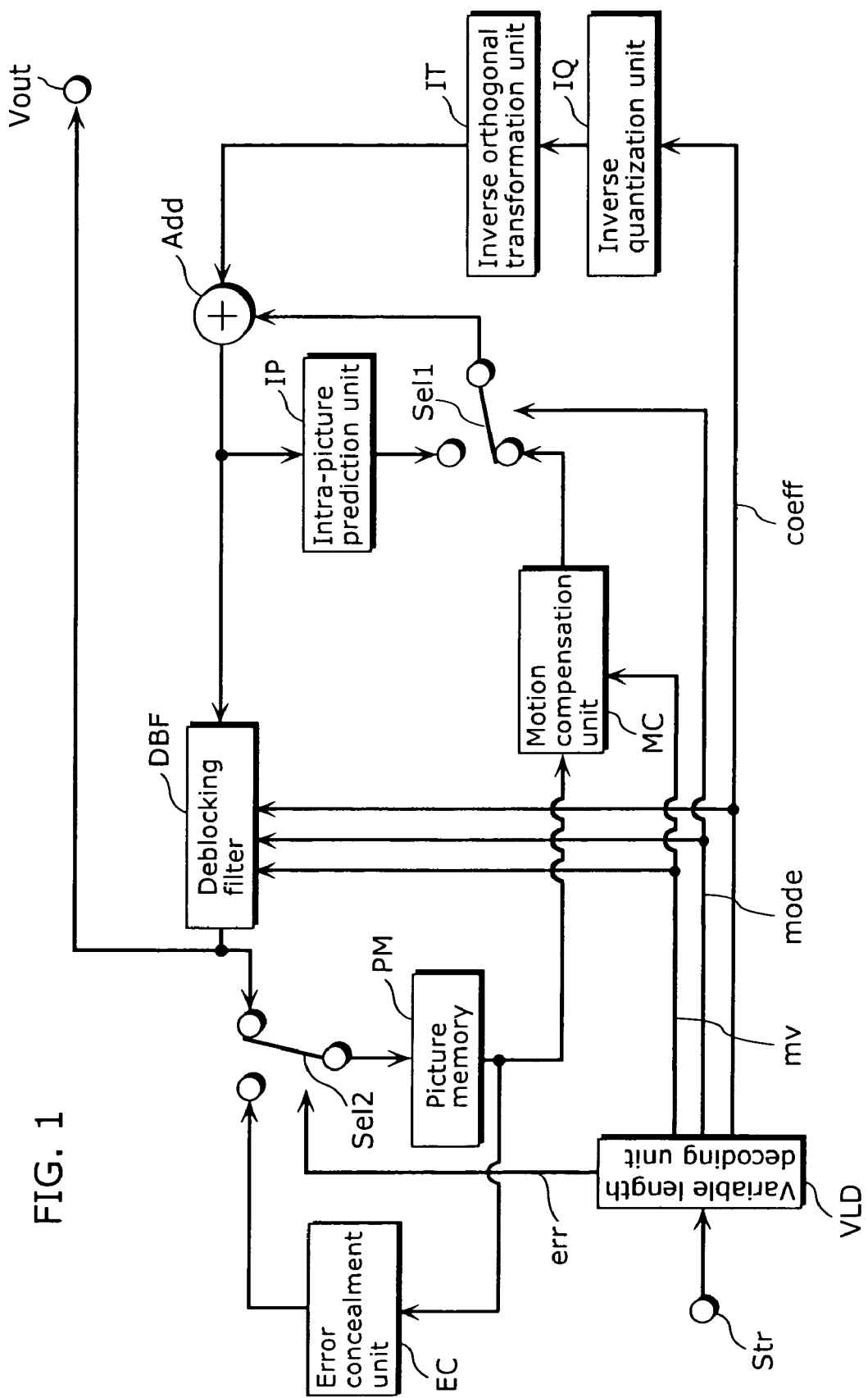
FIG. 1 is a block diagram showing a structure of a picture decoding apparatus that uses a conventional picture decoding method.
Figure 6:
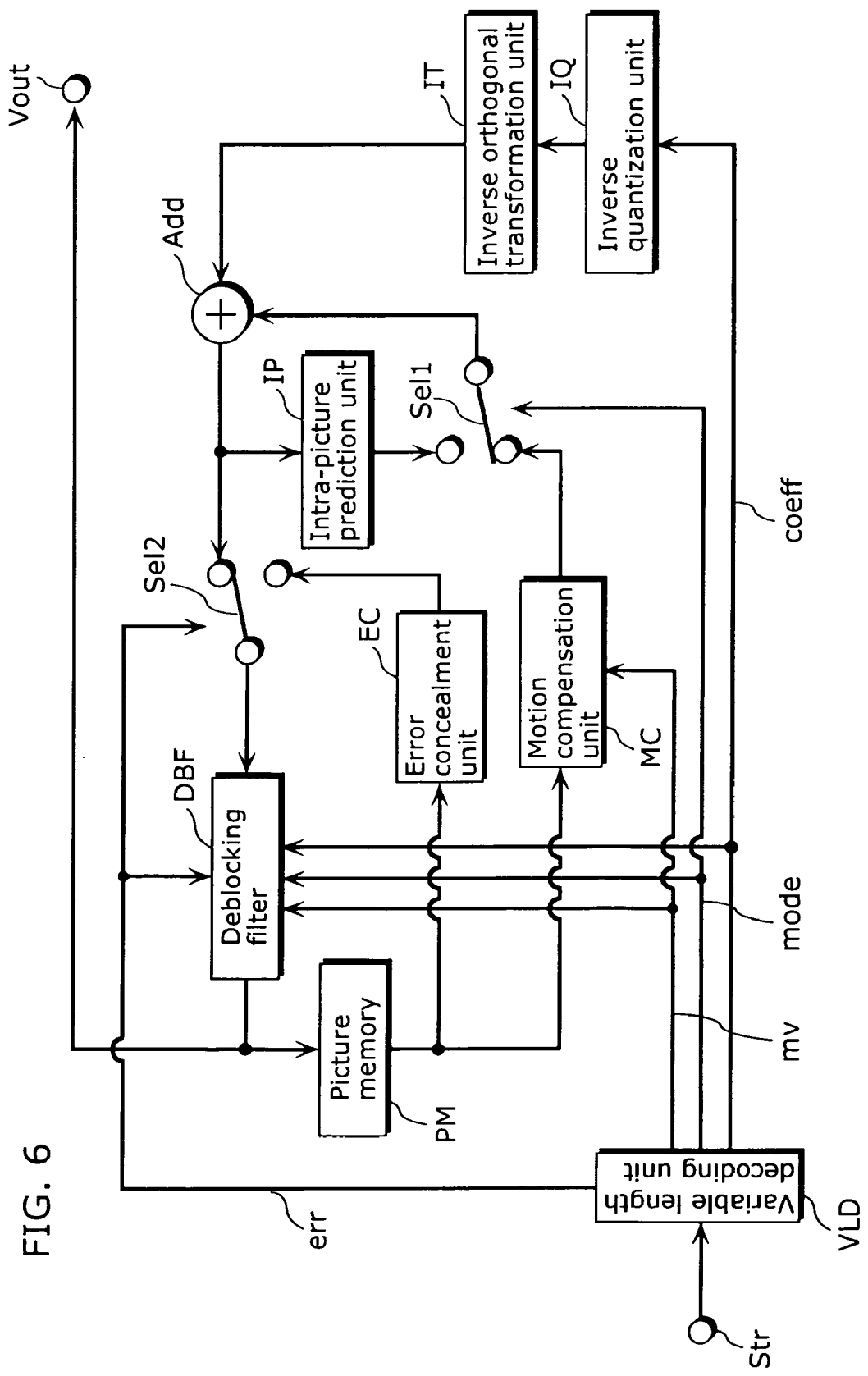
FIG. 6 is a block diagram showing a structure of a picture decoding apparatus that uses a picture decoding method according to the present invention (First Embodiment)

FIG. 6 is a block diagram showing a structure of a picture decoding apparatus that uses a picture decoding method in the first embodiment of the present invention. The block diagram of the picture decoding apparatus that uses the picture decoding method of the present invention in FIG. 6 is different from the block diagram of the conventional picture decoding apparatus in FIG. 1 in that in addition to the prediction error coeff, coding mode mode and motion information mv, the error information err is inputted to the deblocking filter DBF in FIG. 6.

This picture decoding apparatus is a picture decoding apparatus that detects an error in each block included in a coded data Str, and switches, depending on whether an error is detected or not, the smoothing level of a deblocking filter DBF for smoothing distortion in the boundary between blocks, or determines whether or not to perform filtering. As shown in FIG. 6, this picture decoding apparatus includes a variable length decoding unit VLD, an inverse quantization unit IQ, an inverse orthogonal transformation unit IT, a motion compensation unit MC, an intra-picture prediction unit IP, an error concealment unit EC, an addition unit Add, a deblocking filter DBF, a picture memory PM, a switch Sel1 and a switch Sel2.

Coded data Str is decoded by the variable length decoding unit VLD, and error information err, motion information mv, a coding mode mode and a prediction error coeff are outputted. The variable length decoding unit VLD is one example of a unit that detects whether or not each block in the coded data contains an error. For example, the variable length decoding unit judges that an error is contained in coded data Str when data which matches a specific syntax is missing, and outputs error information err. More specifically, the variable length decoding unit judges that an error is contained in coded data Str when a specific number of data within a predetermined range of values cannot be obtained in a predetermined order, when a specific pattern of "0" and "1" cannot be obtained at a predetermined position or time in coded data Str, or the like. For example, in the case where coded data Str is transmitted in the form of IP packets or the like, the coded data is divided into slices or the smaller data units and each divided data is stored in each IP packet. When an error occurs, for example, an IP packet is missing, the variable length decoding unit VLD identifies the missing slice based on the packet number of the missing IP packet, and judges that the error is contained in blocks throughout the slice or in a part of the slice. The error information err is information which indicates whether or not each block in the coded data Str contains an error. The motion information mv is information necessary for inter-picture motion compensation and includes information which indicates a motion vector and a picture referred to for inter-picture motion compensation. The coding mode mode is information which indicates whether a block has been intra coded or inter coded. The prediction error coeff is a coded prediction error in intra-picture or inter-picture coding and is information which indicates the size of the prediction error.

The inverse quantization unit IQ performs inverse quantization on the prediction error coeff and outputs the inversely quantized error to the inverse orthogonal transformation unit IT. The inverse orthogonal transformation unit IT performs inverse orthogonal transformation on the error and outputs the resulting data to the addition unit Add.

The motion compensation unit MC is one example of a unit that decodes an inter-picture coded block in the coded data using, as a reference picture, a picture in which the filtering determined as above has been applied to all the boundaries between blocks. When a block is inter coded, the motion compensation unit MC performs motion compensation, based on the information indicated by the motion information mv, on the pixel values of a reference picture outputted from the picture memory PM, and outputs the resulting data to the switch Sel1. At that time, the deblocking filter DBF is applied to the reference picture outputted from the picture memory PM.

When a block is intra coded, the intra-picture prediction unit IP performs intra-picture prediction of the output from the addition unit Add and outputs the resulting data to the switch Sel1.

The switch Sel1 selects the output from the intra-picture prediction unit IP if the coding mode mode indicates intra-picture coding, and it selects the output from the motion compensation unit MC if the coding mode mode indicates inter-picture coding.

The addition unit Add adds the output of the inverse orthogonal transformation unit IT and the output of the switch Sel1. The output of the addition unit Add is decoded pixel values to which a deblocking filter has not yet been applied, and is used as reference pixel values for intra-picture prediction performed by the intra-picture prediction unit IP.

Figure 4:
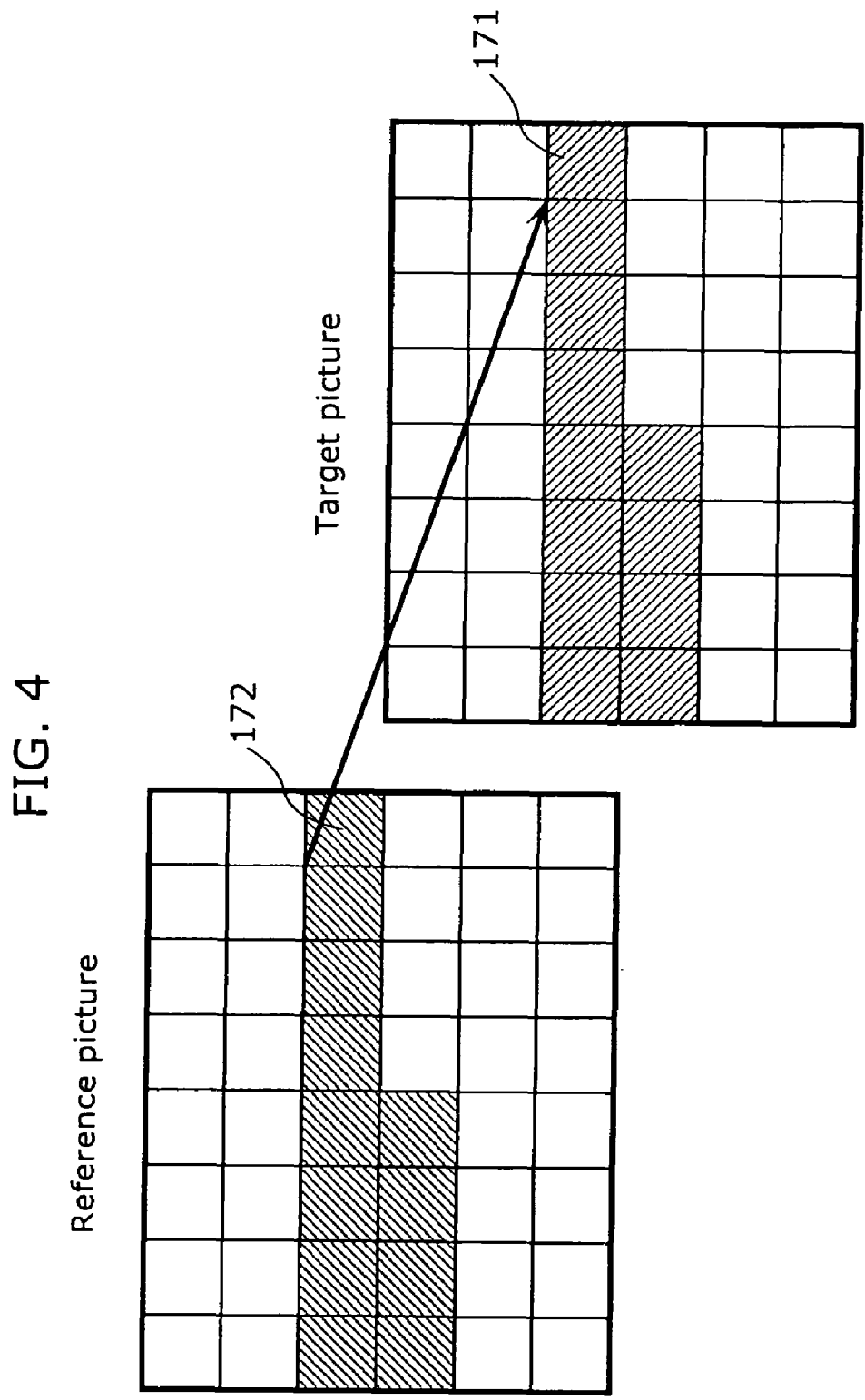
FIG. 4 is a diagram for explaining error concealment.
Figure 5:
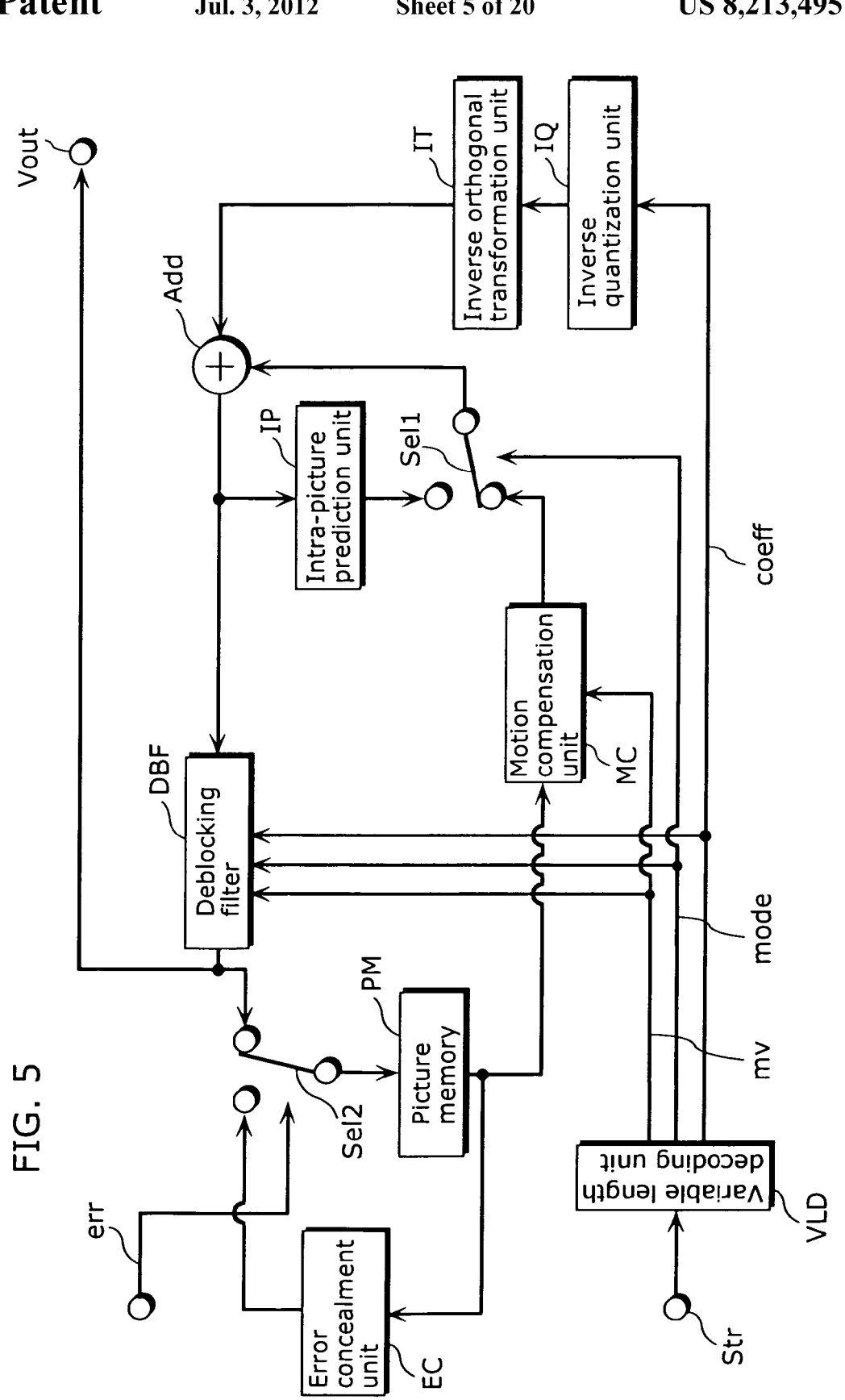
FIG. 5 is a block diagram showing a structure of another picture decoding apparatus that uses a conventional picture decoding method.

The error concealment unit EC is one example of a unit that replaces pixel values of respective pixels in a block that contains an error with pixel values of respective co-located pixels of a co-located block in a reference picture by regarding the block that contains the error as a block which has been inter-picture coded with a motion vector of zero. In the case where the error information err indicates that the block contains an error, the error concealment unit EC outputs the error-concealed pixel block generated from a decoded picture stored in the picture memory PM, instead of the decoded pixel values of the block, as shown in FIG. 4.

The deblocking filter DBF applies deblocking filtering on the output from the addition unit Add by referring to the motion information mv, the coding mode mode and the prediction error coeff, so as to remove blocking distortion and generate a decoded picture Vout. The generated decoded picture Vout is outputted to outside for display, and at the same time, it is stored into the picture memory PM via the switch Sel 2 for use as a reference picture. More specifically, the deblocking filter DBF is one example of a unit that determines, based on whether an error is detected or not in each block, whether or not filtering should be performed on a boundary between two adjacent blocks, and which one of deblocking filters with different smoothing levels should be used for filtering of the boundary. A deblocking filter with an appropriate smoothing level is selected for a block in which an error has occurred and has been concealed by the error concealment unit EC using the error information err, so as to remove blocking distortion. Note that for ease of explanation, the case where filtering is not performed is regarded as one type of filtering. More specifically, the smoothing level of the deblocking filter DBF depends on the number of taps of the filter. If the deblocking filter DBF is an adaptable filter, the smoothing level depends on the threshold value of filtering used for judgment of whether filtering should be applied or not. The smoothing level increases as the number of taps of a filter increases, or as the threshold value of filtering decreases.

Figure 7A:
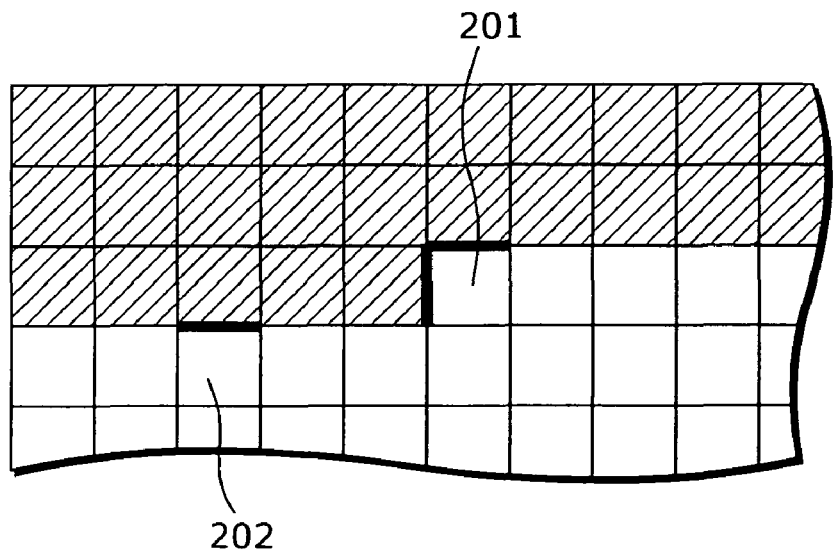
FIG. 7A is a diagram showing an example of block boundaries to which a deblocking filter DBF is applied.

FIG. 7A is a diagram showing an example of block boundaries to which the deblocking filter DBF is applied. In FIG. 7A, the shaded part is blocks in which an error has occurred and has been concealed by the error concealment unit EC. In this diagram, a block 201 shares two boundaries (indicated by heavy lines) with the blocks containing the error. A block 202 shares one boundary (indicated by a heavy line) with the block containing the error. In this case, the deblocking filter DBF for error concealment is applied to the two boundaries indicated by the heavy lines in the block 201, while the deblocking filter DBF for error concealment is applied to the one boundary indicated by the heavy line in the block 202.

Figure 7B:
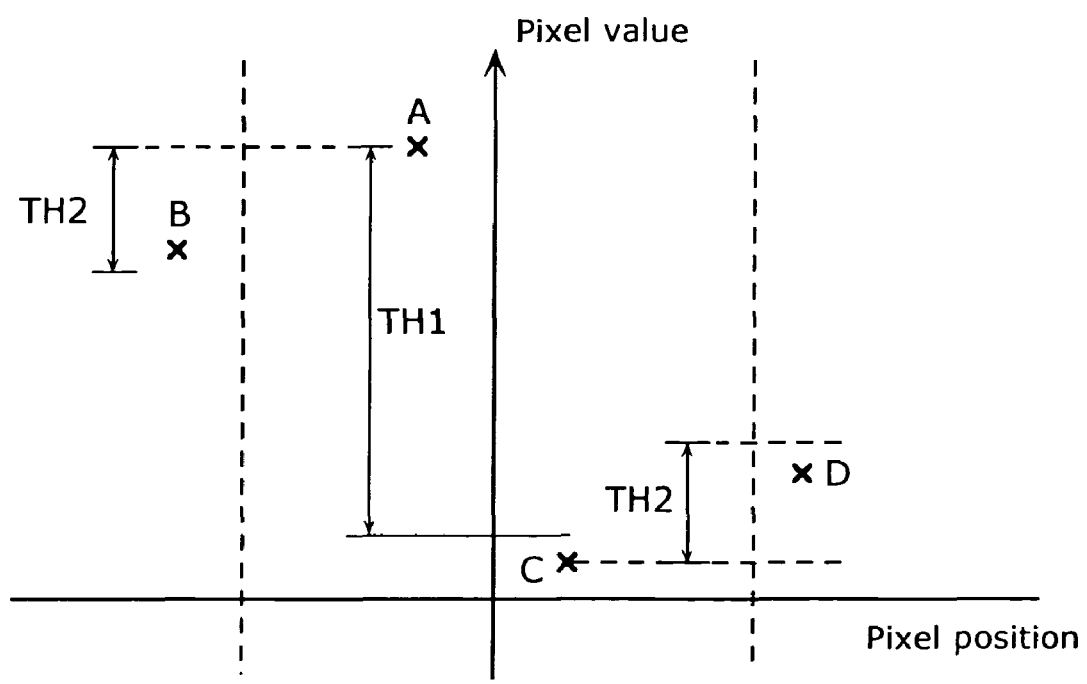
FIG. 7B is a diagram showing an example of operations performed when a deblocking filter DBF is an adaptable filter.

FIG. 7B is a diagram showing an example of operations performed when the deblocking filter DBF is an adaptable filter. In this diagram, the vertical axis indicates the pixel values (for example, luminance levels), while the horizontal axis indicates the positions of respective pixels. There is a block boundary between a pixel A and a pixel C.

First, the difference in pixel values between the pixel A and the pixel C which are located at the both sides of the boundary is compared with a threshold value TH1. When the difference in pixel values is equal to or greater than TH1, no deblocking filter DBF is applied by considering that the original picture has an edge there. When the difference in pixel values is less than TH1, the deblocking filter DBF is applied by considering that this difference is caused by coding distortion.

Next, the difference between the pixel A and the pixel B within a block as well as the difference between the pixel C and the pixel D within another block are respectively compared with a threshold value TH2. The pixel values in the same block should not contain blocking distortion. However, if the deblocking filter DBF is applied to the boundary between the pixel A and the pixel C, the pixel values of these pixels A and C change according to the deblocking filtering. Due to this change in pixel values, the difference in pixels values between the pixel A and the pixel B within a block as well as the difference in pixel values between the pixel C and the pixel D within another block also change accordingly. So, when the difference in pixel values between the pixel A and the pixel B as well as the difference between the pixel C and the pixel D are small, the deblocking filter DBF is applied to the boundary between the pixel A and the pixel C in the judgment that there is no edge in respective blocks. On the contrary, when the difference in pixel values between the pixel A and the pixel B as well as the difference between the pixel C and the pixel D are large, deblocking filter is not applied or a weak deblocking filter DBF is applied to the boundary between the pixel A and the pixel C because deblocking filtering to the boundary between the pixel A and the pixel C could remove an edge within the blocks. For example, since the difference in pixel values between the pixel A and the pixel C exceeds the threshold value TH1, no deblocking filter DBF is applied by considering that there is an edge between the pixel A and the pixel C in the original picture. If the difference of pixel values between the pixel A and the pixel C is less than the threshold value TH1, the deblocking filter DBF is applied to the boundary between the blocks because the difference of pixel values between the pixel A and the pixel B and the difference between the pixel C and the pixel D are both less than the threshold value TH2.

As described above, the use of an adaptable filter allows switching between application and nonapplication of a deblocking filter depending on a threshold value. Therefore, the strength of the deblocking filter DBF (the likelihood that deblocking filtering is to be applied) can be switched by switching the threshold value.

A description will be given below as to specific examples of selection of deblocking filters, i.e., selection methods 1 to 4, using error information err.

(Selection Method 1)

Figure 3:
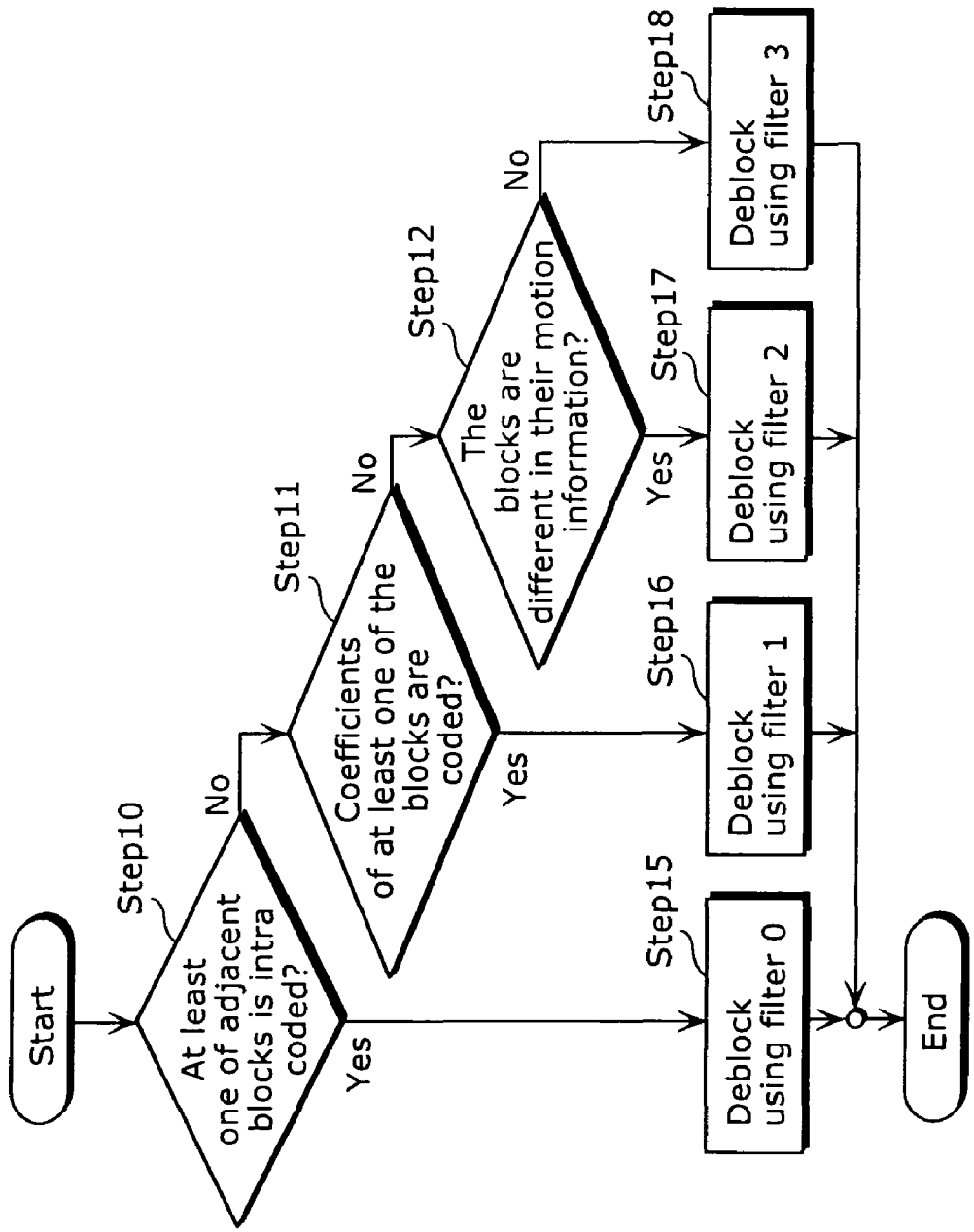
FIG. 3 is a flowchart showing deblocking filters to be selected in the conventional picture coding method.
Figure 8:
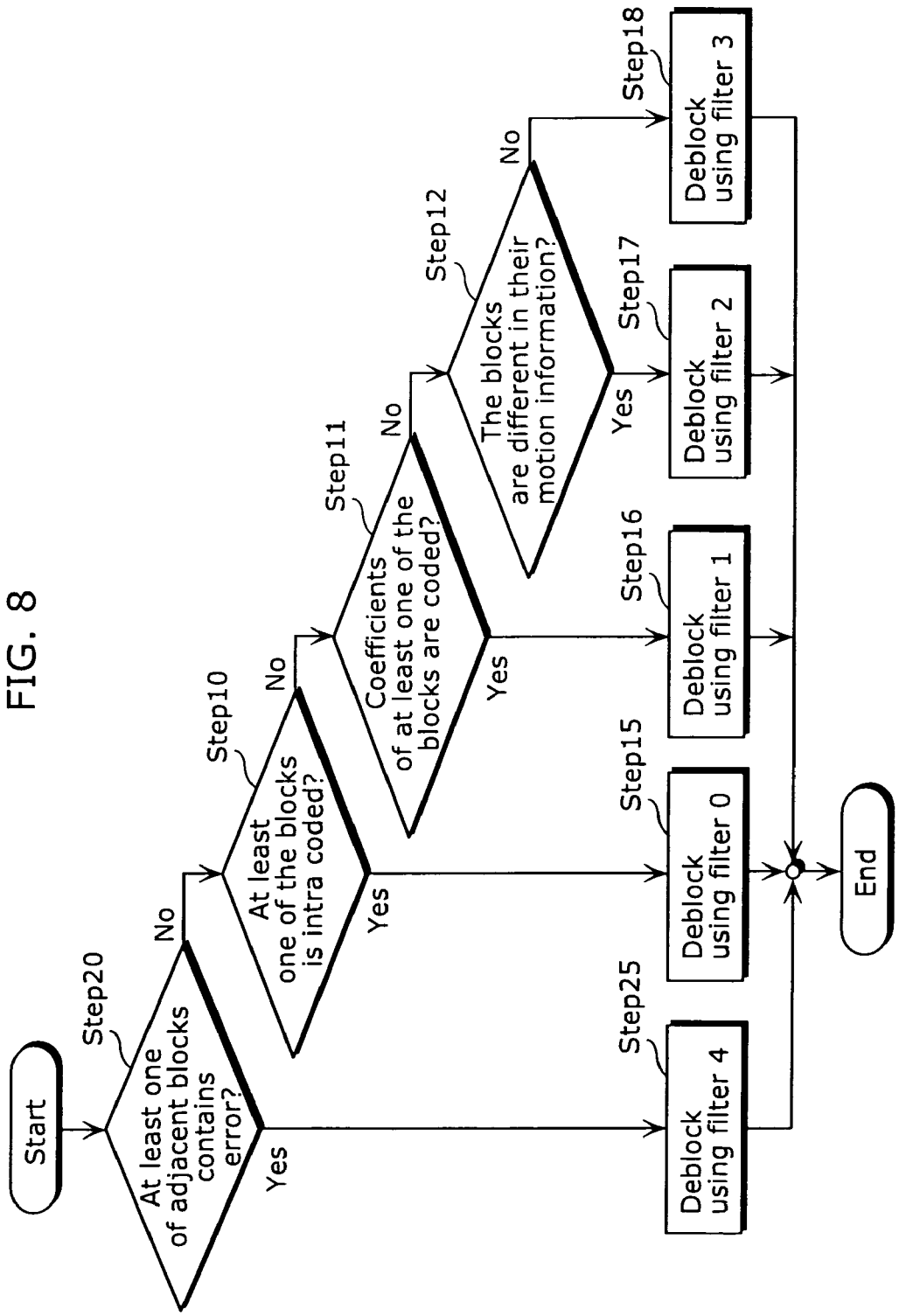
FIG. 8 is a flowchart showing deblocking filtes to be selected in the picture decoding method of the present invention (Selection Method 1)

FIG. 8 is a flowchart showing a sequence of steps for performing deblocking filtering according to the selection method 1 in the picture decoding method of the present invention. Since some of the steps in the flowchart for performing deblocking filtering according to the selection method 1 as shown in FIG. 8 are the same as the steps in the flowchart for performing deblocking filtering according to the conventional picture coding method as shown in FIG. 3, the identical step numbers are assigned to such steps and a description thereof is not repeated here.

The deblocking filter DBF is one example of a unit that determines that filtering should be performed on a boundary between a block that contains an error and a block adjacent to the block, using a deblocking filter with the highest smoothing level among the deblocking filters.

In Step 20, it is judged whether or not at least one of the adjacent two blocks contains an error which has been concealed. When it contains an error which has been concealed (Yes in Step 20), deblocking filtering is performed using the filter 4 in Step 25, and the process is ended. The filter 4 is a deblocking filter specifically used for a block that contains an error which has been concealed. When neither block contains an error (No in Step 20), the process goes to Step 10, and the following steps for determining a deblocking filter to be used are the same as the steps in the flowchart in the conventional picture coding method as shown in FIG. 3.

As described above, even if a block in which an error has occurred and has been concealed, it is possible to perform deblocking filtering suitable for such an error-concealed block to remove blocking distortion in the block.

Note that the filter 4 need not be newly provided but the filter 0 with the highest smoothing level may be used instead of the filter 4.

(Selection Method 2)

Figure 9:
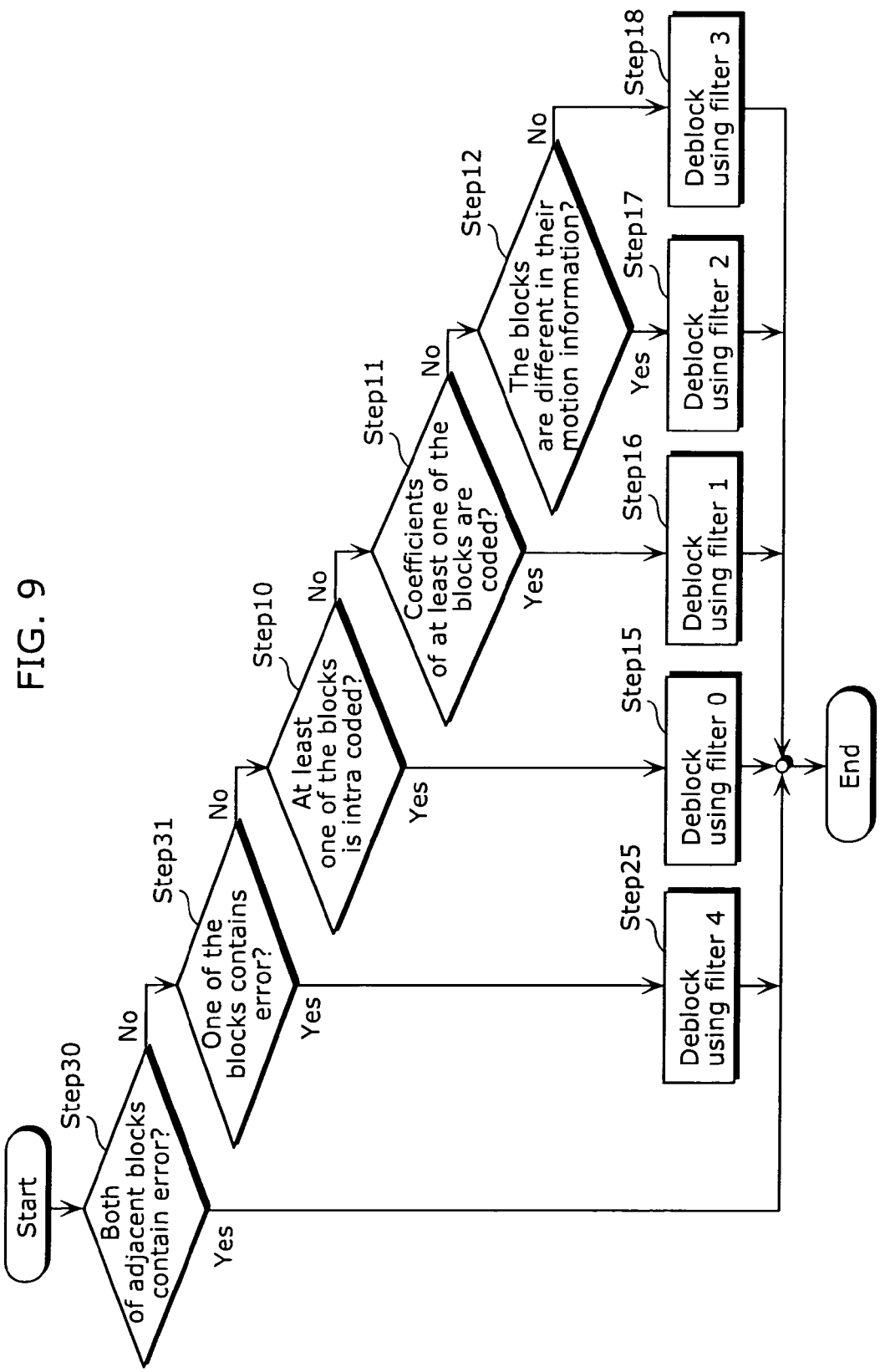
FIG. 9 is a flowchart showing deblocking filters to be selected in the picture decoding method of the present invention (Selection Method 2)

FIG. 9 is a flowchart showing a sequence of steps for performing deblocking filtering according to the selection method 2 in the picture decoding method of the present invention. Since some of the steps in the flowchart for performing deblocking filtering according to the selection method 2 as shown in FIG. 9 are the same as the steps in the flowchart for performing deblocking filtering according to the selection method 1 as shown in FIG. 8, the identical step numbers are assigned to such steps and a description thereof is not repeated here.

The deblocking filter DBF is one example of a unit that determines that filtering should not be performed on a boundary between blocks when a block adjacent to a block that contains an error also contains an error. More specifically, in Step 30, it is judged whether or not an error has occurred in both of two adjacent blocks and has been concealed. In the case where an error has occurred in both of the blocks, the error is concealed by the method as shown in FIG. 4 using a reference picture. Since deblocking filtering has already been performed on the boundary between these blocks when the reference picture was decoded, there is no need to perform deblocking filtering again. So, when an error is detected in both of the blocks (Yes in Step 30), no deblocking filtering is performed and the process is ended. In other cases (No in Step 30), the process goes to Step 31.

In Step 31, it is judged whether or not at least one of the two blocks contains an error which has been concealed. When at least one of the blocks contains an error (Yes in Step 31), deblocking filtering is performed using the filter 4 as used in Step 25, and the process is ended. The filter 4 is a deblocking filter specifically used for a block in which an error has occurred and has been concealed. When neither block contains an error (No in Step 31), the process goes to Step 10, and the following steps for determining a deblocking filter to be used are the same as the steps in the flowchart in the picture decoding method of the present invention as shown in FIG. 8.

As described above, when both blocks contain an error, deblocking filtering is not performed on these blocks. In other words, the pixel values of a reference picture which have been deblocking filtered at the time of decoding the reference picture are not deblocking filtered again. Therefore, it is possible to prevent excessive blurring of the block boundaries.

Note that the filter 4 need not be newly provided, and the filter 0 with the highest smoothing level may be used instead of the filter 4.

(Selection Method 3)

Figure 10:
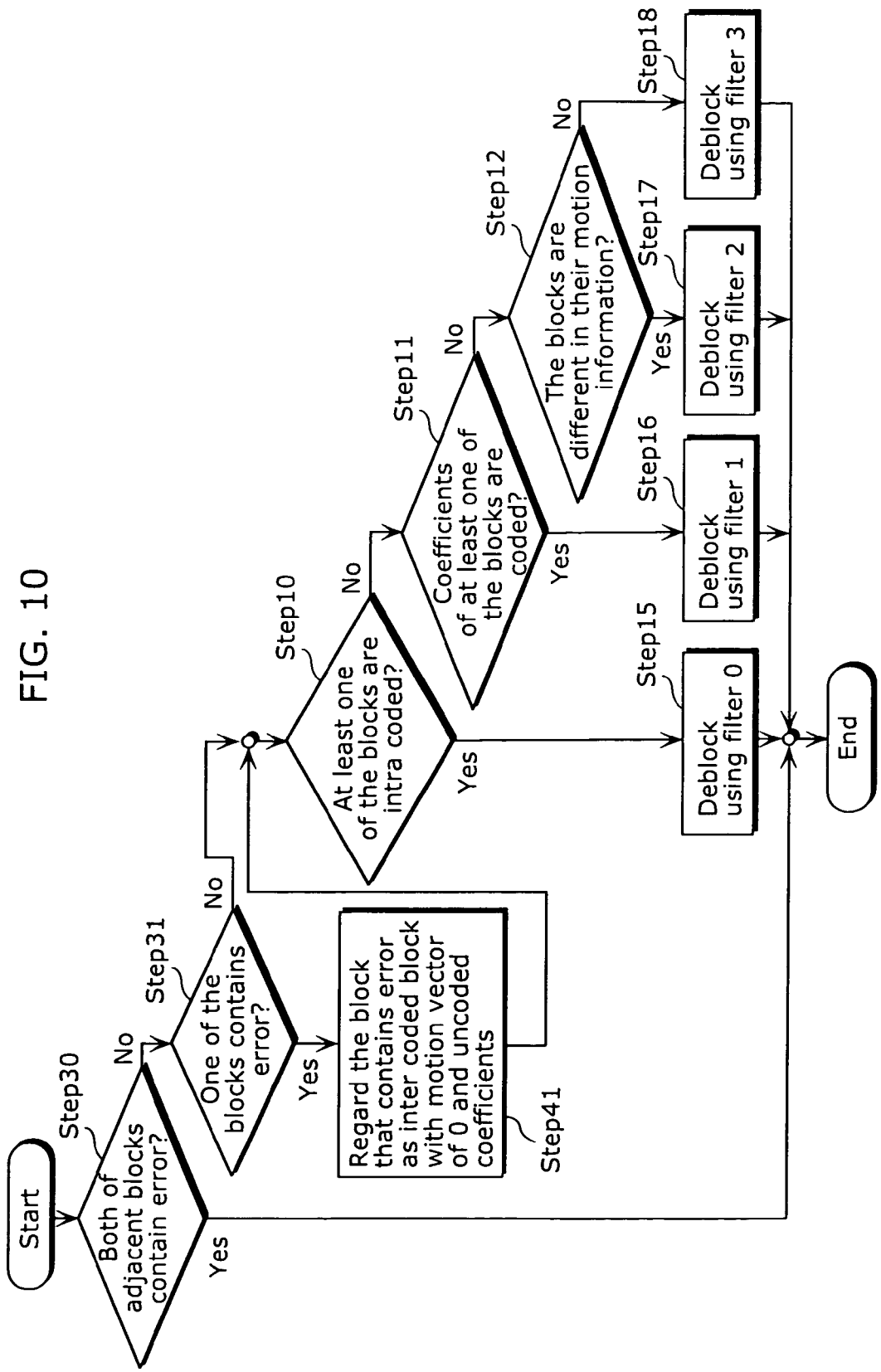
FIG. 10 is a flowchart showing deblocking filters to be selected in the picture decoding method of the present invention (Selection Method 3)

FIG. 10 is a flowchart showing a sequence of steps for performing deblocking filtering according to the selection method 3 in the picture decoding method of the present invention. Since some of the steps in the flowchart for performing deblocking filtering according to the selection method 3 as shown in FIG. 10 are the same as the steps in the flowchart for performing deblocking filtering according to the selection method 1 as shown in FIG. 8, the identical step numbers are assigned to such steps and a description thereof is not repeated here.

In Step 31, it is judged whether or not one of two adjacent blocks contains an error which has been concealed. In the case where the block contains an error (Yes in Step 31), concealment using a reference picture is carried out by the method as shown in FIG. 4 for explaining error concealment. In error concealment, the pixels of a block that contains an error are replaced with the pixel values of a spatially co-located block in a reference picture. Therefore, such error concealment can be regarded as the decoding process which is equivalent to the decoding of an inter coded block that contains the motion vector of 0 and uncoded coefficients indicating the residuals in pixel values. The deblocking filter DBF is one example of a unit that adds, to the block in which the pixel values have been replaced in the above replacement, additional information indicating that the block is a block which has been inter-picture coded with a motion vector of zero, and determines whether or not filtering should be performed on the block to which the additional information is added, in the same manner as a block that contains no error, as well as which one of the deblocking filters should be used. Therefore, as for a block that contains an error, processing is performed for regarding the block as an inter coded block that contains a motion vector of 0 and uncoded coefficients indicating the residuals in pixel values. For example, processing is performed for setting, to the block that contains an error, a flag indicating that the block contains the motion vector of 0 and the uncoded coefficients indicating the residuals in pixel values. Then, the process goes to Step 10. When neither block contains an error (No in Step 31), the process goes to Step 10. Step 10 and the subsequent steps differ from the steps in the above embodiments in that it is judged Yes or No after checking whether or not the flag is set indicating that each block is an inter coded block which contains a motion vector of 0 and uncoded coefficients indicating the residuals in pixel values, so as to select a filter for deblocking. The other operations are the same as those in the flowchart of FIG. 8 for performing deblocking filtering by the picture decoding method of the present invention.

According to the above-mentioned processing, even if an error occurs in a block, it is possible to perform appropriate deblocking filtering using the information of the adjacent block that contains no error, based on the almost same processing as the conventional deblocking filtering without considering an error, and thus remove blocking distortion efficiently.

(Selection Method 4)

Figure 11:
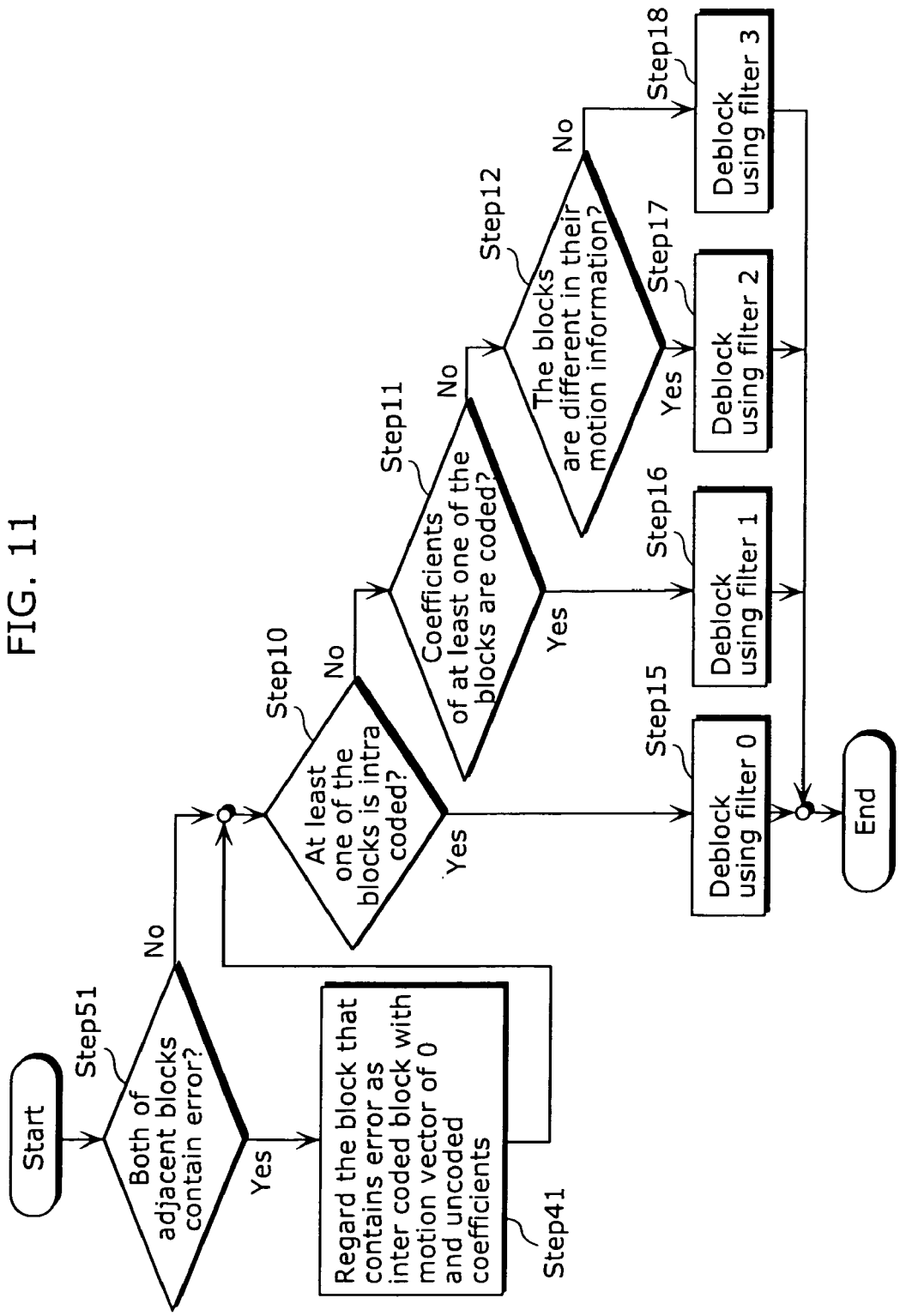
FIG. 11 is a flowchart showing deblocking filters to be selected in the picture decoding method of the present invention (Selection Method 4)

FIG. 11 is a flowchart showing a sequence of steps for performing deblocking filtering according to the selection method 4 in the picture decoding method of the present invention. Since some of the steps in the flowchart for performing deblocking filtering according to the selection method 4 as shown in FIG. 11 are the same as the steps in the flowchart for performing deblocking filtering according to the selection method 3 as shown in FIG. 10, the identical step numbers are assigned to such steps and a description thereof is not repeated here.

In Step 51, it is judged whether or not two adjacent blocks contain an error which has been concealed. In the case where the blocks contain an error (Yes in Step 51), concealment using a reference picture is carried out by the method as shown in FIG. 4 for explaining error concealment. In error concealment, the pixels of a block that contains an error are replaced with the pixel values of a spatially co-located block in a reference picture. Therefore, such error concealment can be regarded as the decoding process which is equivalent to the decoding of an inter coded block that contains the motion vector of 0 and uncoded coefficients indicating the residuals in pixel values. Therefore, as for a block that contains an error, processing is performed for regarding the block as an inter coded block that contains a motion vector of 0 and uncoded coefficients indicating the residuals in pixel values. For example, processing is performed for setting a flag to the block that contains an error, and then the process goes to Step 10.

When neither block contains an error (No in Step 51), the process goes to Step 10.

When both blocks contain an error, these blocks are considered to be inter coded blocks that respectively contain motion vectors of 0 and uncoded coefficients. As a result, after the process in Step 10, the process goes to Step 11 and Step 12, and in Step 18, deblocking filtering is performed using the filter 3 with the lowest smoothing level.

The other steps are the same as those in the flowchart of FIG. 10 for performing deblocking filtering by the picture decoding method of the present invention.

By the above processing, regardless of whether one of the blocks contains an error or both of them contain an error, it is possible to perform the same steps as those in the case where neither block contains an error, after the block (or blocks) that contain(s) the error is (are) processed in Step 41, and therefore to achieve almost the same effect as that of the selection method 3 by simpler processing.

Second Embodiment

Figure 12:
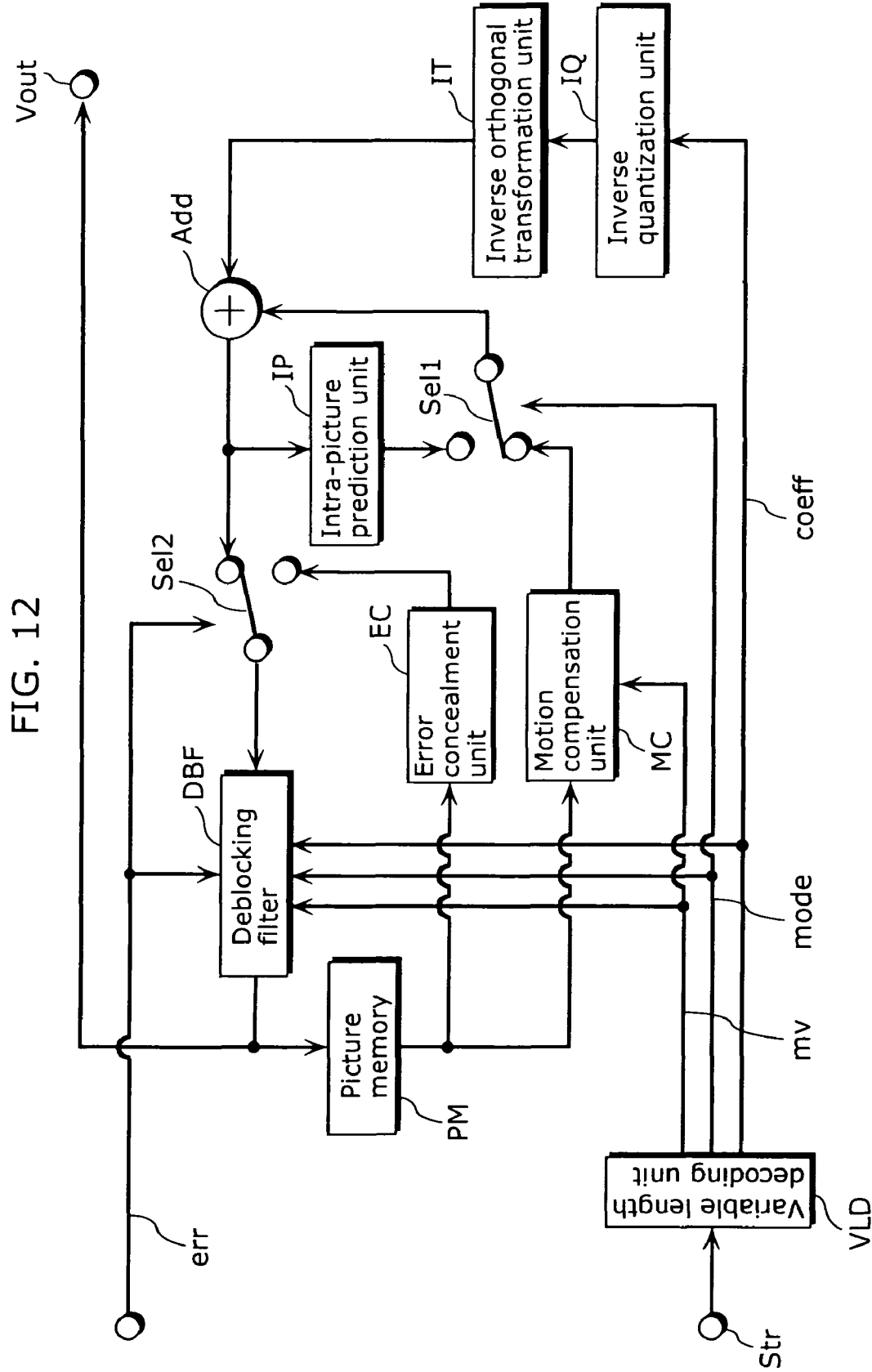
FIG. 12 is a block diagram showing a structure of a picture decoding apparatus that uses a picture decoding method according to the present invention (Second Embodiment)

FIG. 12 is a block diagram showing a structure of a picture decoding apparatus that uses the picture decoding method in the second embodiment of the present invention. Since some of the processing units in the block diagram of the picture decoding apparatus of the present invention in FIG. 12 operate in the same manner as those in the block diagram of the picture decoding apparatus of the present invention in FIG. 6, the identical reference numbers are assigned to such processing units and a description thereof is not repeated here.

In the first embodiment, the variable length decoding unit VLD in the picture decoding apparatus of FIG. 6 detects error information err in coded data Str. However, in some types of applications or implementations of devices, the error information err can be obtained, not from the coded data Str, but from a device which receives the coded data Str. In such a case, the error information err is given from outside, as shown in FIG. 12.

Figure 13:
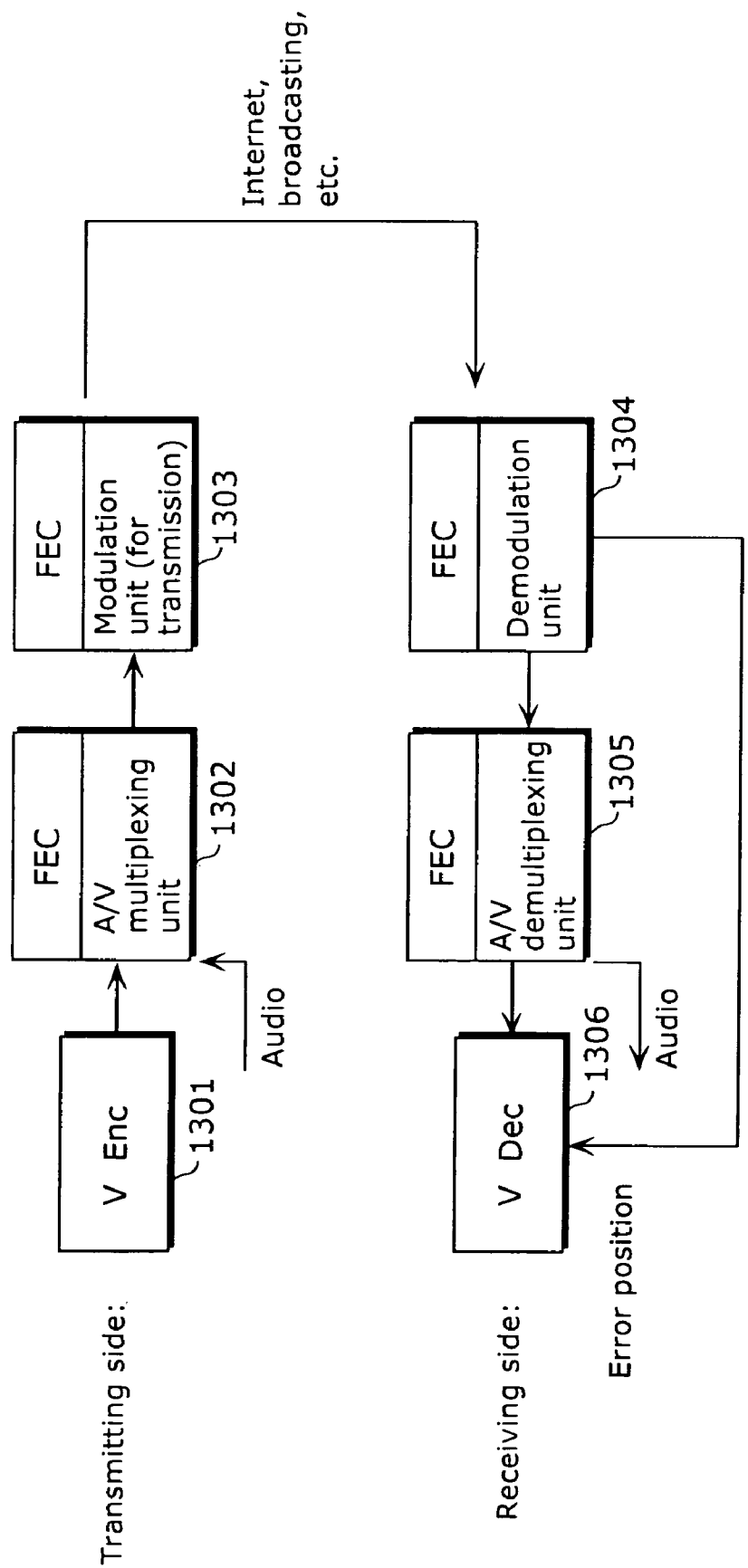
FIG. 13 is a diagram showing relationship between a transmitting side device which transmits coded data via a transmission path such as the Internet and a receiving side device which receives the coded data.

FIG. 13 is a diagram showing relationship between a transmitting side device which transmits coded data via a transmission path such as the Internet and a receiving side device which receives the coded data via the transmission path. As shown in this diagram, the transmitting side apparatus includes a V Enc 1301 which is a picture coding apparatus, an A/V multiplexing unit 1302 and a modulation unit 1303. The V Enc 1301 codes video and outputs the coded video stream to the A/V multiplexing unit 1302 which is the subsequent stage. The A/V multiplexing unit 1302 multiplexes the coded video stream inputted from the V Enc 1301 with a separately inputted coded audio stream. Furthermore, the A/V multiplexing unit 1302 add, to the multiplexed coded stream, error correction code FEC which does not depend on transmission media, and outputs the resulting stream to the modulation unit 1303. The modulation unit 1303 modulates the multiplexed coded stream inputted from the A/V multiplexing unit 1302 into the stream for analog transmission. At that time, the modulation unit 1303 adds, to the converted stream, error correction code FEC appropriate for each transmission path (for example, broadcasting, the Internet or the like) when necessary, and sends out the resulting stream to the analog transmission path.

The receiving side apparatus receives the multiplexed coded stream which has been sent out as such. Note that the receiving side apparatus includes a demodulation unit 1304, an A/V demultiplexing unit 1305, and, at the final stage, a V Dec 1306 which is the picture decoding apparatus of the present invention. Here, the demodulation unit 1304 and the A/V demultiplexing unit 1305 are one example of an error position detection unit that detects a position of an IP packet in the coded data, at which a transmission error has occurred. The multiplexed coded stream which has been received by the receiving side apparatus via the transmission path is first demodulated by the demodulation unit 1304. At this time, the error which has occurred on the transmission path is corrected by the demodulation unit 1304 based on the error correction code FEC. When the error can be properly corrected by this error correction, the position in the stream at which the error has occurred is not notified. On the other hand, in the case where the error cannot be corrected by this error correction because the error occurs frequently, the position in the stream at which the error has occurred is notified in such a manner as, for example, the demodulation unit 1304 judges that a transmission error has occurred when the electric field strength becomes lower than a specific threshold value. The multiplexed coded stream which has been demodulated by the demodulation unit 1304 is inputted to the A/V demultiplexing unit 1305, and demultiplexed into a coded video stream and a coded audio stream by the A/V demultiplexing unit 1305. Furthermore, the A/V demultiplexing unit 1305 also makes error correction of the demultiplexed coded streams respectively based on the error correction code FEC. In the case where the error can be properly corrected by the error correction, the position in the stream at which the error has occurred is not notified. On the other hand, in the case where the error cannot be corrected by the error correction because the error occurs frequently, the position in the stream at which the error has occurred is notified in such a manner as, for example, the A/V demultiplexing unit 1305 judges that a transmission error has occurred when it detects discontinuity of serial numbers of packets included in the header. A packet is a unit of transmission. The demultiplexed coded audio stream is outputted to an audio decoding apparatus not shown in the diagram. The V Dec 1306 is one example of a picture decoding apparatus including a determination unit which determines, based on whether each block is in the error position in the coded data, whether or not filtering should be performed on a boundary between two adjacent blocks, and which one of deblocking filters with different smoothing levels should be used for filtering of the boundary. On the other hand, the demultiplexed coded video stream is inputted, as coded data Str, to the V Dec which is the picture decoding apparatus, and then decoded. At this time, the position of the error in the coded data Str, which could not be corrected by the demodulation unit 1304 and the A/V demultiplexing unit 1305 even using the error correction code FEC, is notified, as error information err, to the V Dec 1306.

It should be noted, in this case, that since the position of the error notified by the error information err is indicated by the position in the coded stream, a block which contains the error is identified in the decoding process within the V Dec 1306. FIG. 12 shows an example where error information err is directly inputted to the deblocking filter DBF, but it may be inputted to the variable length decoding unit VLD. The same applies to FIG. 15 to be described later.

With the above-mentioned structure, even if error information err is given from outside, it is possible to select an appropriate deblocking filter and remove blocking distortion for a block in which an error has occurred and has been concealed by the error concealment unit EC, as is the case with the first embodiment shown in FIG. 6.

Third Embodiment

Figure 14:
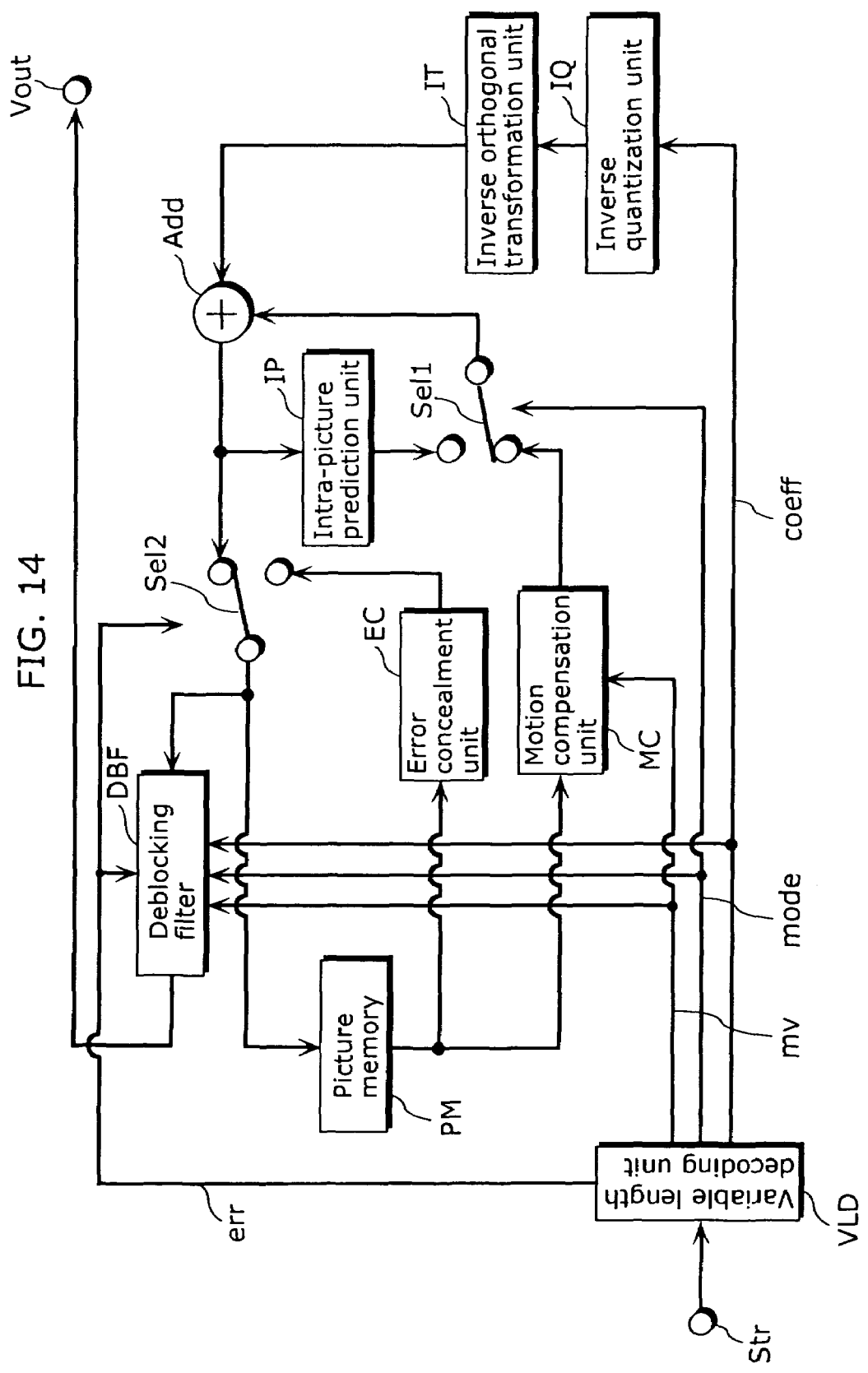
FIG. 14 is a block diagram showing a structure of a picture decoding apparatus that uses a picture decoding method according to the present invention (Third Embodiment)

FIG. 14 is a block diagram showing a structure of a picture decoding apparatus that uses a picture decoding method in the third embodiment of the present invention. Since some of the processing units in the block diagram of the picture decoding apparatus of the present invention in FIG. 14 operate in the same manner as those in the block diagram of the picture decoding apparatus of the present invention in FIG. 6, the identical reference numbers are assigned to such processing units and a description thereof is not repeated here.

In the first embodiment as shown in FIG. 6 and the second embodiment as shown in FIG. 12, a description is given as to the picture decoding apparatus which stores the data obtained as a result of filtering using the deblocking filter DBF into the picture memory PM and uses that data as a reference picture in the motion compensation unit MC and the error concealment unit EC. This type of filtering is called in-loop filtering because the result of deblocking filtering is used for inter-picture prediction.

According to the feature of the present invention that error information err is used for switching of a deblocking filter, the data obtained as a result of filtering using the deblocking filter is a decoded picture Vout. However, this feature can also be applied to the case where a picture which has not yet been deblocking filtered is stored in the picture memory PM. This type of filtering is called post-filtering because the result of deblocking filtering is not used for inter-picture prediction.

With the above-mentioned structure, even in the picture decoding in which the result of deblocking filtering is not used for inter-picture prediction, it is possible to select an appropriate deblocking filter and remove blocking distortion for a block in which an error has occurred and has been concealed by the error concealment unit EC.

Fourth Embodiment

Figure 15:
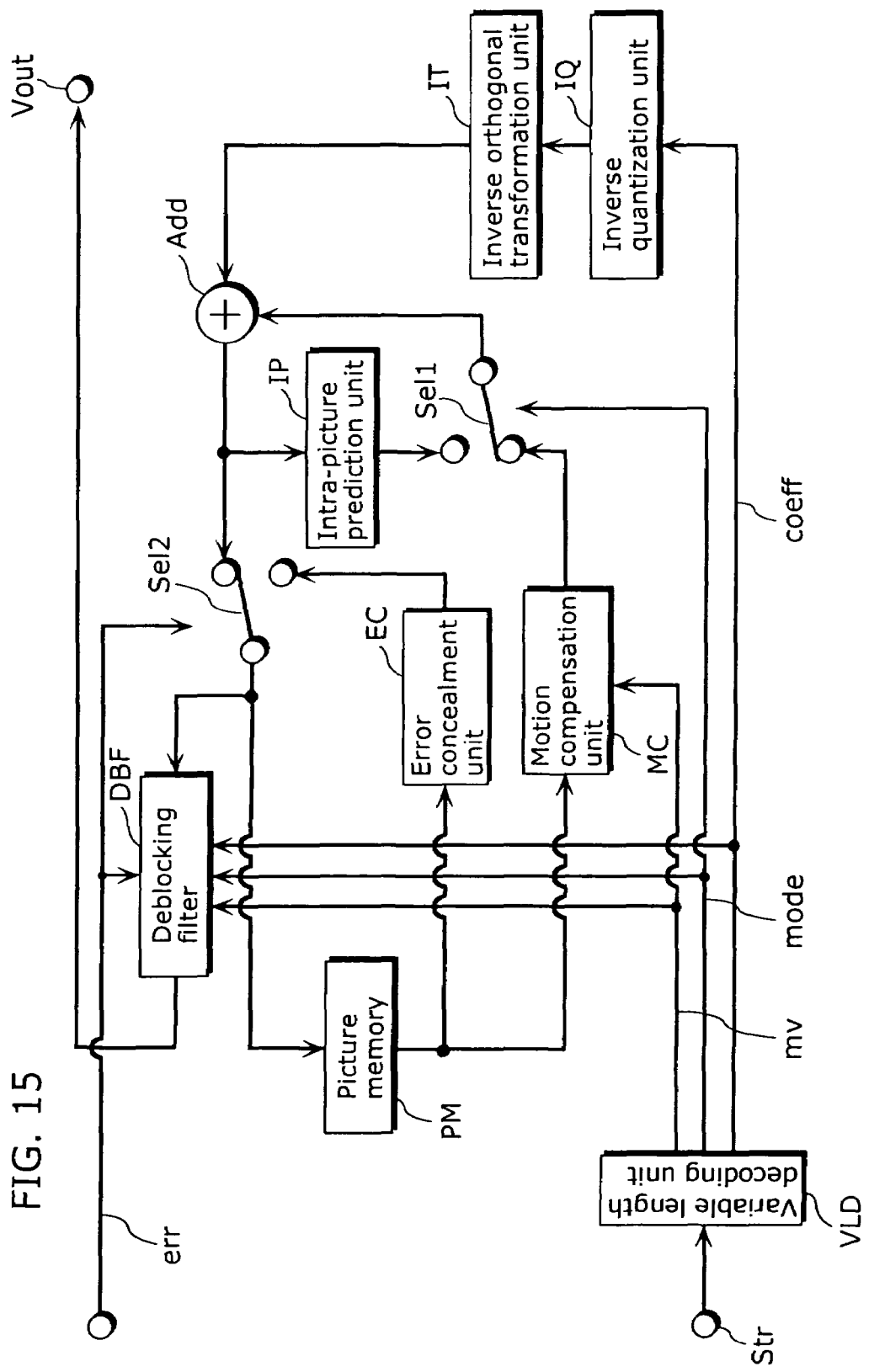
FIG. 15 is a block diagram showing a structure of a picture decoding apparatus that uses a picture decoding method according to the present invention (Fourth Embodiment)

FIG. 15 is a block diagram showing a structure of a picture decoding apparatus that uses a picture decoding method in the fourth embodiment of the present invention. Since some of the processing units in the block diagram of the picture decoding apparatus of the present invention in FIG. 15 operate in the same manner as those in the block diagram of the picture decoding apparatus of the present invention in FIG. 14, the identical reference numbers are assigned to such processing units and a description thereof is not repeated here.

The variable length decoding unit VLD in the picture decoding apparatus of FIG. 14 detects error information err from coded data Str. However, in some types of applications or implementations of devices, the error information err can be obtained, not from the coded data Str, but from a device or a processing unit (such as a receiving unit) which receives the coded data Str. In this case, the error information err is given from outside, as shown in FIG. 15.

With the above-mentioned structure, even if error information err is given from outside, it is possible to select an appropriate deblocking filter and remove blocking distortion for a block in which an error has occurred and has been concealed by the error concealment unit EC, as is the case with the third embodiment shown in FIG. 14.

It should be noted that in the above embodiments, descriptions are given as to the case where filtering is performed while switching the smoothing level of the deblocking filter DBF, on blocking distortion which occurs in the boundary between a block, which contains an error caused by a transmission error on a transmission path such as the Internet and digital broadcasting, and a block adjacent to that block. However, the present invention is not limited to this case. The present invention further allows appropriate smoothing of blocking distortion caused by a reading error due to a blemish on a DVD disc in the same manner.

Fifth Embodiment

Furthermore, the processing described in each of the above embodiments can easily be carried out by an independent computer system by recording a program for implementing the picture decoding method as described in each of the above embodiments onto a recording medium such as a flexible disk or the like.

Figure 16A:
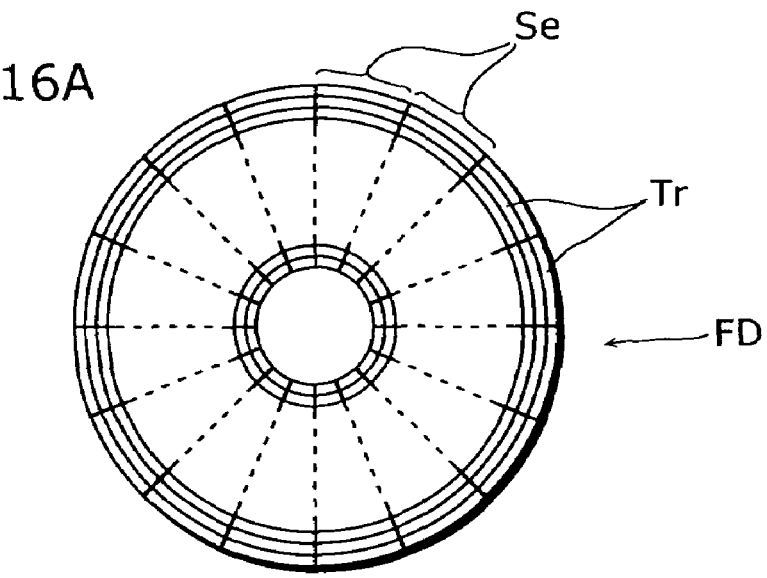
FIGS. 16A, 16B and 16C are diagrams for explaining a recording medium on which a program for implementing in a computer system the picture decoding method described in each of the above embodiments is recorded.
Figure 16B:
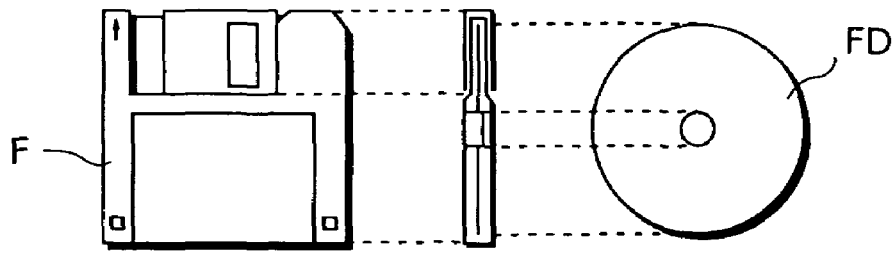
Figure 16C:
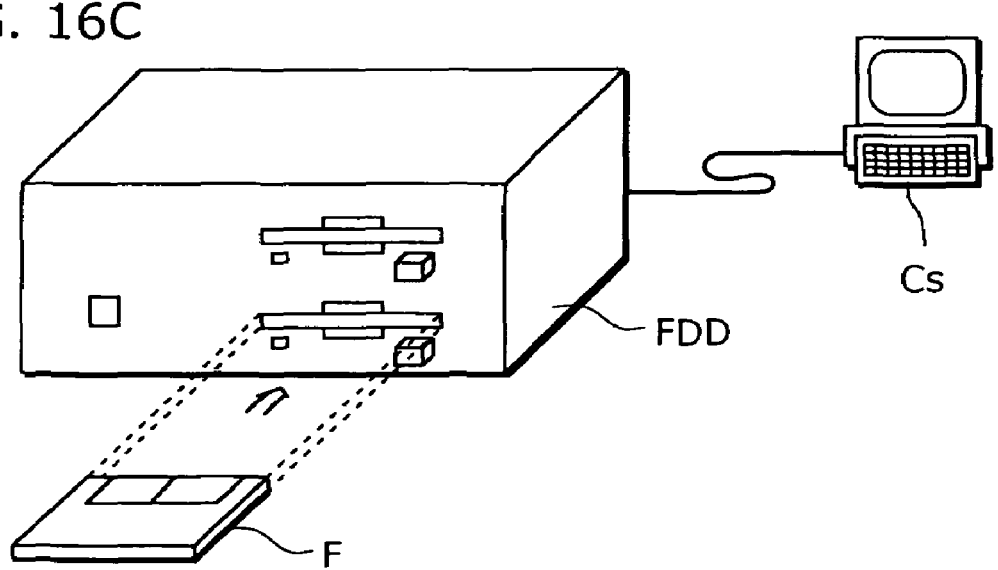

FIGS. 16A, 16B, and 16C are descriptive diagrams of a recording medium such as a flexible disk or the like, on which a program for implementing the picture decoding method as described in each of the above embodiments in the computer system is recorded.

FIG. 16B shows a full appearance of a flexible disk FD, its structure at a cross section and a full appearance of the disk FD itself as a main body of a recording medium, whereas FIG. 16A shows an example of a physical format of the flexible disk FD. The disk FD is contained in a case F and has a plurality of tracks Tr formed concentrically from the periphery to the inside on the surface thereof, and each track is divided into 16 sectors Se in the angular direction. Thus, the picture decoding method as the program mentioned above is recorded in an area assigned for it on the flexible disk FD.

FIG. 16C shows a structure for recording and reproducing the program on and from the flexible disk FD. When the program for implementing the picture decoding method is recorded on the flexible disk FD, the computer system Cs writes the program therein via a flexible disk drive. When the picture coding method is constructed in the computer system Cs using the program recorded on the flexible disk FD, the program is read out from the flexible disk FD and then transferred to the computer system Cs by the flexible disk drive.

In the above explanation, the flexible disk FD is used as an example of a recording medium, but the same processing can also be performed using an optical disk. In addition, the recording medium is not limited to these mentioned above, but any other medium capable of recording a program such as an IC card and a ROM cassette can be employed.

Sixth Embodiment

The following is a description for the application of the picture decoding method illustrated in each of the above-mentioned embodiments and a system using the method.

Figure 17:
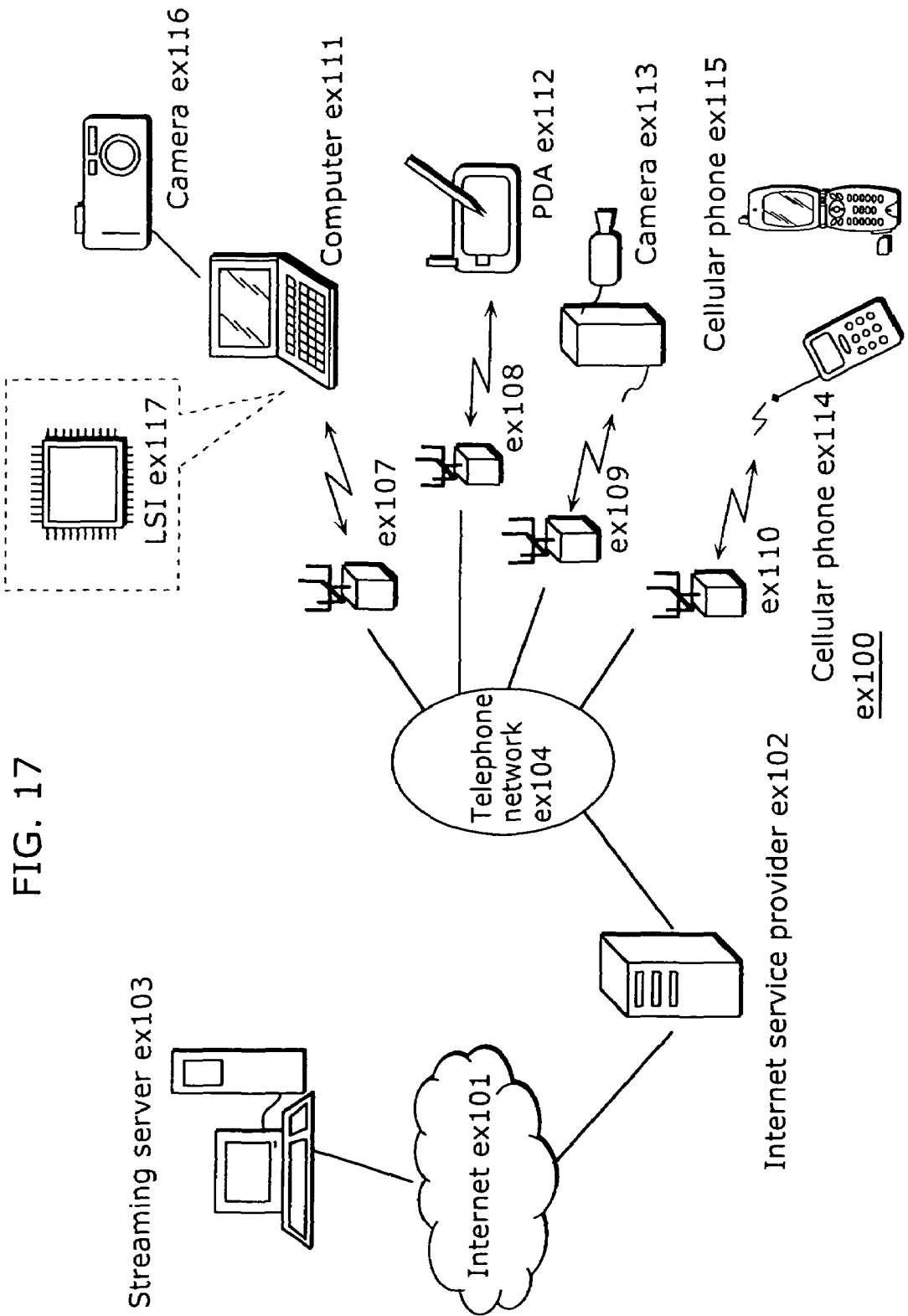
FIG. 17 is a block diagram showing an overall configuration of a content supply system (Sixth Embodiment)

FIG. 17 is a block diagram showing an overall configuration of a content providing system ex100 for realizing content distribution services. The area for providing communication services is divided into cells of desired size, and base stations ex107 to ex110, which are fixed wireless stations, are placed in respective cells.

This content providing system ex100 is connected to devices such as a computer ex111, a personal digital assistant (PDA) ex112, a camera ex113, a cellular phone ex114 and a camera-equipped cellular phone ex115 and the like via, for example, the Internet ex101, an Internet service provider ex102, a telephone network ex104, as well as the base stations ex107 to ex110.

However, the configuration of the content providing system ex100 is not limited to the configuration shown in FIG. 17; a combination in which any of the elements are connected is acceptable. In addition, each device may be directly connected via the telephone network ex104, rather than via the base stations ex107 to ex110 which are the fixed wireless stations.

The camera ex113 is a device such as a digital video camera or the like which is capable of shooting video. The cellular phone may be the one that meets any of the standards such as Personal Digital Communications (PDC), Code Division Multiple Access (CDMA), Wideband-Code Division Multiple Access (W-CDMA), Global System for Mobile Communications (GSM), or the like.

A streaming server ex103 is connected to the camera ex113 via the telephone network ex104 and also the base station ex109, which realizes a live distribution or the like using the camera ex113 based on the coded data transmitted from the user. Either of the camera ex113 or the server or the like which transmits the data may code the data. The video data shot by a camera ex116 may be transmitted to the streaming server ex103 via the computer ex111. The camera ex116 is a device such as a digital camera which is capable of shooting still and moving pictures. In this case, either the camera ex116 or the computer ex111 may code the video data. An LSI ex117 included in the computer ex111 or the camera ex116 performs the coding processing. Software for coding and decoding pictures may be integrated into some type of storage medium (such as a CD-ROM, a flexible disk, a hard disk and the like) that is a recording medium which is readable by the computer ex111 or the like. Furthermore, the camera-equipped cellular phone ex115 may transmit the video data. This video data is the data which has been coded by the LSI included in the cellular phone ex115.

The content providing system ex100 codes content (such as a music live video) shot by a user using the camera ex113, the camera ex116 or the like in the same way as shown in the above-mentioned embodiments and transmits it to the streaming server ex103, while the streaming server ex103 carries out stream distribution of the content data to the clients at their requests. The clients include the computer ex111, the PDA ex112, the camera ex113, the cellular phone ex114 and so on capable of decoding the above-mentioned coded data. In the content providing system ex100, the clients can thus receive and reproduce the coded data, and can further receive, decode and reproduce the data in real time so as to realize personal broadcasting.

When each device in this system performs decoding, the picture decoding apparatus shown in each of the embodiments can be used.

Figure 18:
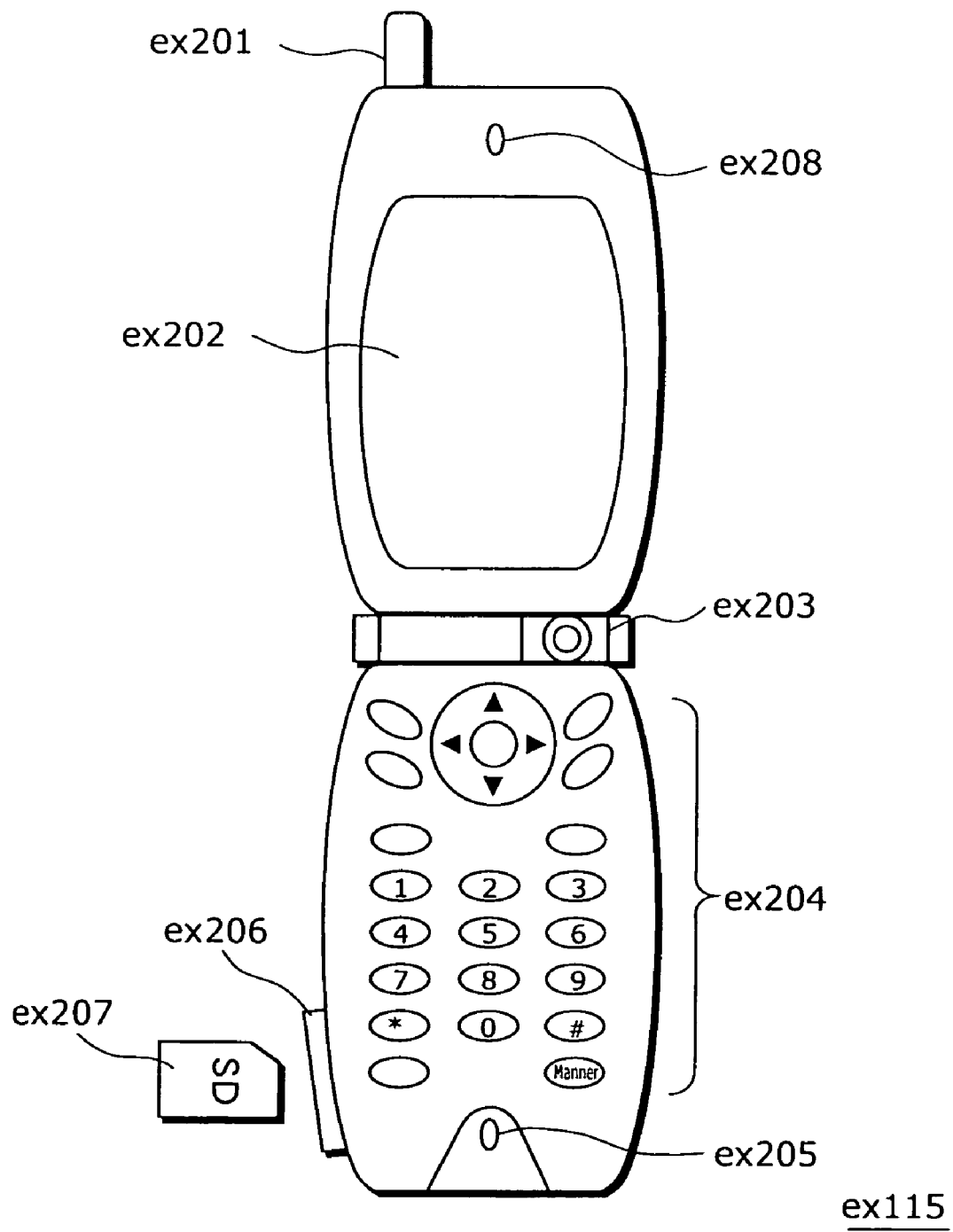
FIG. 18 is a diagram showing an example of a cellular phone that uses a picture decoding method (Sixth Embodiment)

A cellular phone will be explained as an example of such a device. FIG. 18 is a diagram showing the cellular phone ex115 that uses the picture decoding method described in each of the embodiments. The cellular phone ex115 includes: an antenna ex201 for communicating with the base station ex110 via radio waves; a camera unit ex203 such as a CCD camera capable of shooting moving and still pictures; a display unit ex202 such as a liquid crystal display for displaying the data such as decoded video and the like shot by the camera unit ex203 or received by the antenna ex201; a main body unit including a set of operation keys ex204; an audio output unit ex208 such as a speaker for outputting audio; an audio input unit ex205 such as a microphone for inputting audio; a recording medium ex207 for recording coded or decoded data such as data of moving or still pictures shot by the camera, data of received e-mails and that of moving or still pictures; and a slot unit ex206 for attaching the recording medium ex207 to the cellular phone ex115. The recording medium ex207 stores, within a plastic case, a flash memory element, which is one type of Electrically Erasable and Programmable Read-Only Memory (EEPROM), which in turn is a non-volatile memory that is electrically rewritable and erasable; for example, an SD Card.

Next, the cellular phone ex115 will be explained with reference to FIG. 19. In the cellular phone ex115, a main control unit ex311, designed in order to control overall each unit of the main body which contains the display unit ex202 as well as the operation keys ex204, is connected mutually, via a synchronous bus ex313, to a power supply circuit unit ex310, an operation input control unit ex304, a picture coding unit ex312, a camera interface unit ex303, a liquid crystal display (LCD) control unit ex302, a picture decoding unit ex309, a multiplexing/demultiplexing unit ex308, a recording/reproducing unit ex307, a modem circuit unit ex306 and an audio processing unit ex305.

When a call-end key or a power key is turned ON by a user's operation, the power supply circuit unit ex310 supplies the respective units with power from a battery pack so as to activate the camera-equipped digital cell phone ex115 so as to put it into a ready state.

In the cellular phone ex115, the audio processing unit ex305 converts the audio signals received by the audio input unit ex205 in conversation mode into digital audio data under the control of the main control unit ex311 made up of a CPU, ROM, RAM, or the like, the modem circuit unit ex306 performs spread spectrum processing for the digital audio data, and the communication circuit unit ex301 performs digital-to-analog conversion and frequency conversion for the data, so as to transmit it via the antenna ex201. Also, in the cellular phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the audio processing unit ex305 converts it into analog audio data, so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the base station ex110 via the antenna ex201.

When picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as described for the present invention, compresses and codes the picture data supplied from the camera unit ex203 using the coding method employed by the picture coding apparatus as shown in each of the embodiments mentioned above, so as to transform it into coded picture data, and sends it out to the multiplexing/demultiplexing unit ex308. At this time, the cellular phone ex115 sends out, as digital audio data, the audio received by the audio input unit ex205 during the shooting with the camera unit ex203 to the multiplexing/demultiplexing unit ex308 via the audio processing unit ex305.

The multiplexing/demultiplexing unit ex308 multiplexes the coded picture data supplied from the picture coding unit ex312 and the audio data supplied from the audio processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency conversion of the data for the transmission via the antenna ex201.

When receiving data of a video file which is linked to a Web page or the like in data communication mode, the modem circuit unit ex306 performs inverse spread spectrum processing for the data received from the base station ex110 via the antenna ex201, and sends out the multiplexed data obtained as a result of the inverse spread spectrum processing to the demultiplexing unit ex308.

In order to decode the multiplexed data received via the antenna ex201, the multiplexing/demultiplexing unit ex308 demultiplexes the multiplexed data into a bit stream of video data and that of audio data, and supplies the coded video data to the picture decoding unit ex309 and the audio data to the audio processing unit ex305, respectively via the synchronous bus ex313.

Next, the picture decoding unit ex309, including the picture decoding apparatus as described for the present invention, decodes the bit stream of the picture data using the decoding method corresponding to the coding method as shown in each of the above-mentioned embodiments so as to generate reproduced video data, and supplies this data to the display unit ex202 via the LCD control unit ex302, and thus the video data included in the video file linked to the Web page, for instance, is displayed. At the same time, the audio processing unit ex305 converts the audio data into analog audio data, and supplies this data to the audio output unit ex208, and thus the audio data included in the video file linked to the Web page, for instance, is reproduced.

Figure 20:
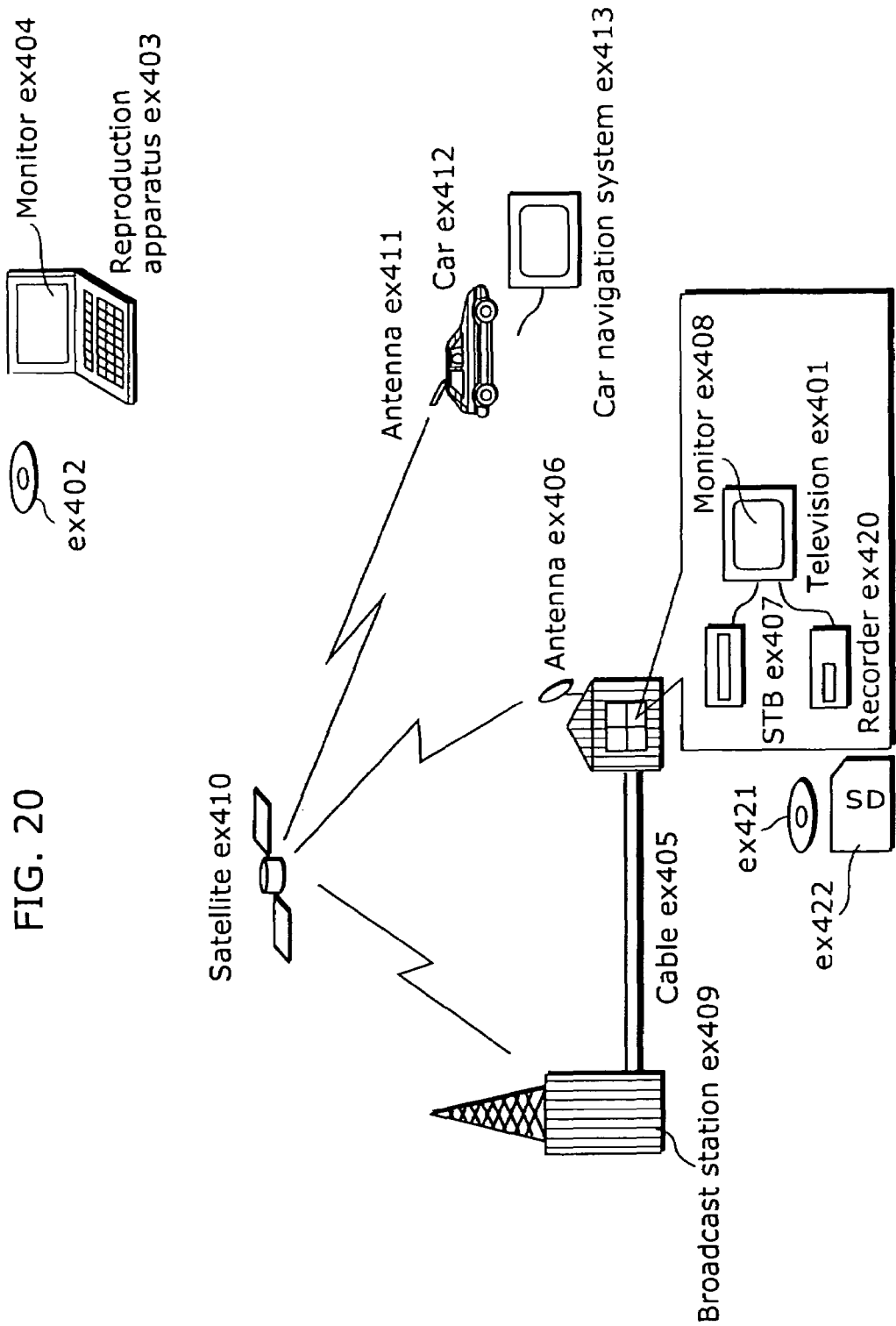
FIG. 20 is an example of a digital broadcast system (Sixth Embodiment).

The present invention is not limited to the above-mentioned system since terrestrial or satellite digital broadcasting has been in the news lately and at least either the picture coding apparatus or the picture decoding apparatus described in each of the above-mentioned embodiments can be incorporated into a digital broadcasting system as shown in FIG. 20. More specifically, a bit stream of video information is transmitted from a broadcast station ex409 to or communicated with a broadcast satellite ex410 via radio waves. Upon receipt of the bit stream, the broadcast satellite ex410 transmits radio waves for broadcasting. Then, a home-use antenna ex406 with a satellite broadcast reception function receives the radio waves, and a television (receiver) ex401 or a set top box (STB) ex407 decodes a coded bit stream for reproduction. The picture decoding apparatus as shown in each of the above-mentioned embodiments can be implemented in the reproduction apparatus ex403 for reading and decoding the coded bit stream recorded on a recording medium ex402 such as a CD, a DVD or the like. In this case, the reproduced video signals are displayed on a monitor ex404. It is also conceivable to implement the picture decoding apparatus in the set top box ex407 connected to a cable ex405 for a cable television or an antenna ex406 for satellite and/or terrestrial broadcasting, so as to reproduce them on a monitor ex408 of the television ex401. The picture decoding apparatus may be incorporated into the television, not in the set top box. Also, a car ex412 having an antenna ex411 can receive signals from the satellite ex410 or the base station ex107 for reproducing video on a display device such as a car navigation system ex413 set in the car ex412.

Furthermore, the picture coding apparatus as shown in each of the above-mentioned embodiments can code picture signals and record them on the recording medium. Specific examples of such an apparatus are a recorder ex420 such as a DVD recorder for recording picture signals on a DVD disc ex421 and a disk recorder for recording them on a hard disk. The picture signals can also be recorded on an SD card ex422. When the recorder ex420 includes the picture decoding apparatus as shown in each of the above-mentioned embodiments, the picture signals recorded on the DVD disc ex421 or the SD card ex422 can be reproduced for display on the monitor ex408.

Figure 19:
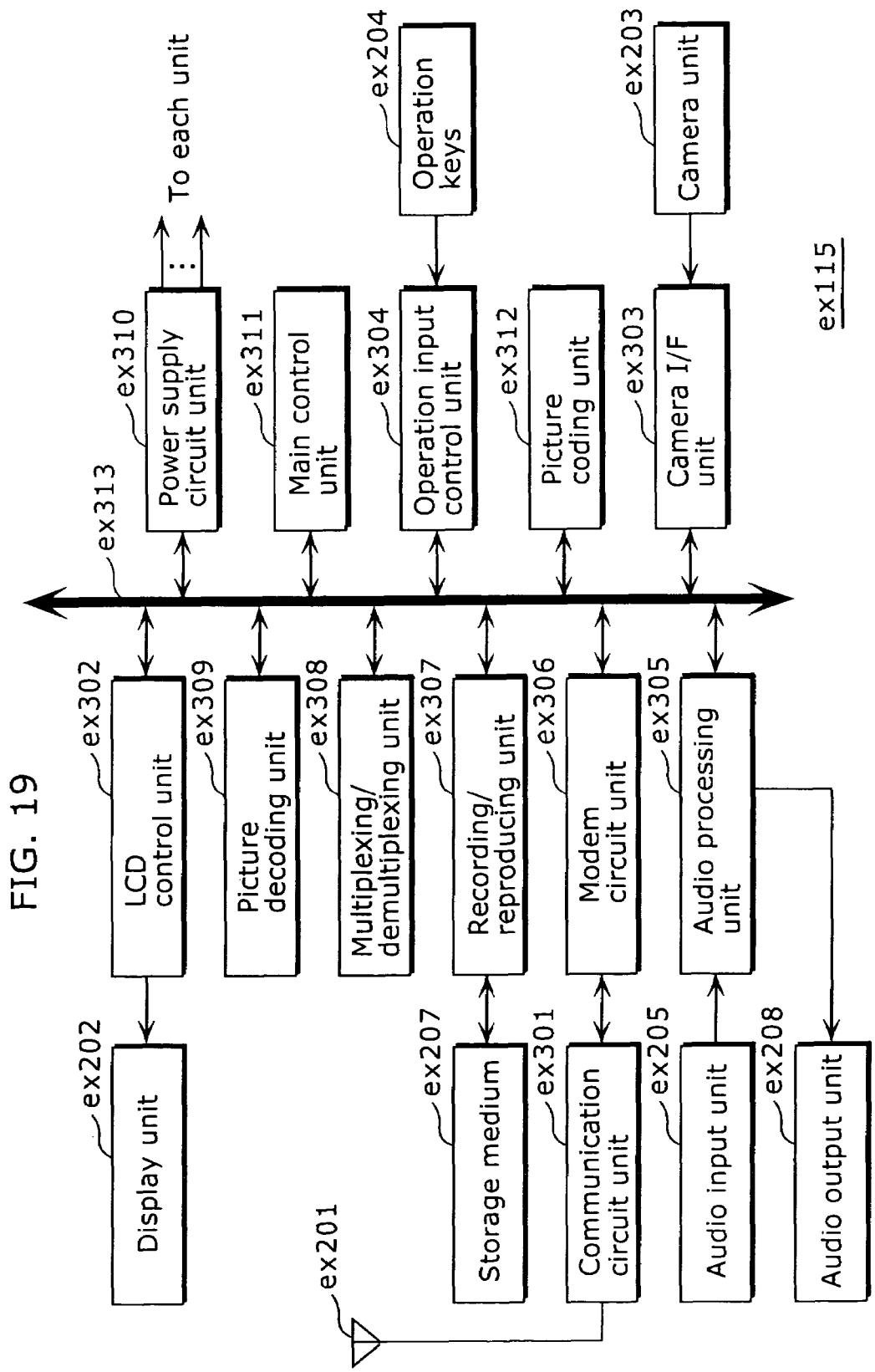
FIG. 19 is a block diagram of a cellular phone (Sixth Embodiment)

As for the structure of the car navigation system ex413, the structure without the camera unit ex203, the camera interface unit ex303 and the picture coding unit ex312, out of the elements shown in FIG. 19, is conceivable. The same applies to the computer ex111, the television (receiver) ex401 and others.

In addition, three types of implementations can be conceived for a terminal such as the cellular phone ex114: a sending/receiving terminal implemented with both an encoder and a decoder, a sending terminal implemented with an encoder only, and a receiving terminal implemented with a decoder only.

As described above, it is possible to use the picture decoding method described in each of the above-mentioned embodiments for any of the above-mentioned devices and systems, and by thus doing, the effects described in the above-mentioned embodiments can be obtained.

Each functional block shown in the block diagrams (FIGS. 1, 5, 6, 12, 14, 15, 16 and so on) is realized as an LSI which is typically an integrated circuit. Each of these blocks can be in plural single-function LSIs, or also can be in one integrated LSI including a part or all of these functions. (For example, the functional blocks other than a memory may be integrated into one chip).

Here, the circuit is called LSI, but there are also cases where, depending on an integration degree, the circuit is called IC, system LSI, super LSI, or ultra LSI.

Moreover, ways to achieve integration are not limited to the LSI, and a special circuit or a general purpose processor and so forth can also achieve the integration. A Field Programmable Gate Array (FPGA) that can be programmed after manufacturing LSI or a reconfigurable processor that allows reconfiguration of the connection or setup of circuit cells inside the LSI can be used for the same purpose.

In the future, with advancement in semiconductor technology or another technology derived therefrom, a brand-new integration technology may replace LSI. The integration can be carried out by that technology. Application of biotechnology is one such possibility.

In addition, only a unit for storing data to be coded or decoded, among these functional blocks, may be treated as a separate function without being integrated into one chip.

According to the present invention, even if an error occurs in a block, it is possible to reconstruct a less degraded decoded picture by switching a deblocking filter adaptively. Therefore, the practical value of the present invention is high.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A picture decoding method for decoding coded data including coded blocks on a block-by-block basis, and smoothing, using a deblocking filter, blocking distortion for each of the decoded blocks, the blocking distortion occurring at a boundary between decoded blocks, said method comprising:
    detecting whether or not each of the blocks included in the coded data contains an error;
    replacing pixel values of pixels in a block that contains an error with pixel values of corresponding co-located pixels of a co-located block in a reference picture by regarding the block that contains the error as a block which has been inter-picture coded with a motion vector of zero;
    adding, to the block in which the pixel values have been replaced in said replacing, additional information indicating that the block is a block which has been inter-picture coded with a motion vector of zero; and
    determining, using different methods depending on a result of said detecting, (i) whether or not filtering should be performed on a boundary between two adjacent blocks, and (ii) which one of a plurality of deblocking filters with different smoothing levels should be used for the filtering of the boundary between the two adjacent blocks when it is determined that the filtering should be performed on the boundary between the two adjacent blocks,
    wherein, for the block to which the additional information is added, said determining uses a same method as for a block that contains no error for determining (i) whether or not the filtering should be performed and (ii) which one of the plurality of deblocking filters should be used for the filtering, and
    wherein when it is detected that both of the two adjacent blocks contain an error, said determining determines that the filtering should not be performed on the boundary between the two adjacent blocks.

2. The picture decoding method according to claim 1,
    wherein when it is detected that at least one of the two adjacent blocks contains an error, said determining determines (i) that the filtering should be performed on the boundary between the two adjacent blocks and (ii) a deblocking filter having a highest smoothing level as the deblocking filter that should be used for the filtering of the boundary between the two adjacent blocks.

3. The picture decoding method according to claim 1, further comprising
    decoding an inter-picture coded block in the coded data using, as a reference picture, a picture in which the filtering determined in said determining has been applied to all boundaries between blocks in the picture.

4. A picture decoding apparatus that decodes coded data including coded blocks on a block-by-block basis, and smoothes, using a deblocking filter, blocking distortion for each of the decoded blocks, the blocking distortion occurring in a boundary between decoded blocks, said apparatus comprising:

an error detection unit operable to detect whether or not each of the blocks included in the coded data contains an error;

an error concealing unit operable to replace pixel values of pixels in a block that contains an error with pixel values of corresponding co-located pixels of a co-located block in a reference picture by regarding the block that contains the error as a block which has been inter-picture coded with a motion vector of zero;

an information adding unit operable to add, to the block in which the pixel values have been replaced by said error concealing unit, additional information indicating that the block is a block which has been inter-picture coded with a motion vector of zero; and a determination unit operable to determine, using different methods depending on a result of the detection, (i) whether or not filtering should be performed on a boundary between two adjacent blocks, and (ii) which one of a plurality of deblocking filters with different smoothing levels should be used for the filtering of the boundary between the two adjacent blocks when it is determined that the filtering should be performed on the boundary between the two adjacent blocks, wherein, for the block to which the additional information is added, said determination unit uses a same method as for a block that contains no error for determining (i) whether or not the filtering should be performed and (ii) which one of the plurality of deblocking filters should be used for the filtering, and wherein when it is detected that both of the two adjacent blocks contain an error, said determination unit determines that the filtering should not be performed on the boundary between the two adjacent blocks.

5. An integrated circuit that implements a picture decoding apparatus which decodes coded data including coded blocks on a block-by-block basis, and smoothes, using a deblocking filter, blocking distortion for each of the decoded blocks, the blocking distortion occurring in a boundary between decoded blocks, said circuit comprising:

an error detection unit operable to detect whether or not each of the blocks included in the coded data contains an error;

an error concealing unit operable to replace pixel values of pixels in a block that contains an error with pixel values of corresponding co-located pixels of a co-located block in a reference picture by regarding the block that contains the error as a block which has been inter-picture coded with a motion vector of zero;

an information adding unit operable to add, to the block in which the pixel values have been replaced by said error concealing unit, additional information indicating that the block is a block which has been inter-picture coded with a motion vector of zero; and a determination unit operable to determine, using different methods depending on a result of the detection, (i) whether or not filtering should be performed on a boundary between two adjacent blocks, and (ii) which one of a plurality of deblocking filters with different smoothing levels should be used for the filtering of the boundary between the two adjacent blocks when it is determined that the filtering should be performed on the boundary between the two adjacent blocks, wherein, for the block to which the additional information is added, said determination unit uses a same method as for a block that contains no error for determining (i) whether or not the filtering should be performed and (ii) which one of the plurality of deblocking filters should be used for the filtering, and wherein when it is detected that both of the two adjacent blocks contain an error, said determination unit determines that the filtering should not be performed on the boundary between the two adjacent blocks.

6. A receiver that receives, via a transmission path, coded data obtained by coding a moving picture on a block-by-block basis, said receiver comprising:

an error position detection unit operable to detect a position in the coded data, the position being a position at which a transmission error has occurred;

an error concealing unit operable to replace pixel values of respective pixels in a block located at the detected position with pixel values of corresponding co-located pixels of a co-located block in a reference picture by regarding the block located at the detected position as a block which has been inter-picture coded with a motion vector of zero;

an information adding unit operable to add, to the block in which the pixel values have been replaced by said error concealing unit, additional information indicating that the block is a block which has been inter-picture coded with a motion vector of zero; and a determination unit operable to determine, using different methods depending on a result of the detection, (i) whether or not filtering should be performed on a boundary between two adjacent blocks, and (ii) which one of a plurality of deblocking filters with different smoothing levels should be used for the filtering of the boundary between the two adjacent blocks when it is determined that the filtering should be performed on the boundary between the two adjacent blocks, wherein, for the block to which the additional information is added, said determination unit uses a same method as for a block that contains no error for determining (i) whether or not the filtering should be performed and (ii) which one of the plurality of deblocking filters should be used for the filtering, and wherein when it is detected that both of the two adjacent blocks contain an error, said determination unit determines that the filtering should not be performed on the boundary between the two adjacent blocks.

7. A non-transitory computer-readable recording medium having stored thereon a program for a picture decoding apparatus which decodes coded data including coded blocks on a block-by-block basis, and smoothes, using a deblocking filter, blocking distortion for each of the decoded blocks, the blocking distortion occurring in a boundary between decoded blocks, wherein, when executed, said program causes the picture decoding apparatus to perform a method comprising:

detecting whether or not each of the blocks included in the coded data contains an error;

replacing pixel values of pixels in a block that contains an error with pixel values of corresponding co-located pixels of a co-located block in a reference picture by regarding the block that contains the error as a block which has been inter-picture coded with a motion vector of zero;

adding, to the block in which the pixel values have been replaced in said replacing, additional information indicating that the block is a block which has been inter-picture coded with a motion vector of zero; and determining, using different methods depending on a result of said detecting, (i) whether or not filtering should be performed on a boundary between two adjacent blocks, and (ii) which one of a plurality of deblocking filters with different smoothing levels should be used for the filtering of the boundary between the two adjacent blocks when it is determined that the filtering should be performed on the boundary between the two adjacent blocks, wherein, for the block to which the additional information is added, said determining uses a same method as for a block that contains no error for determining (i) whether or not the filtering should be performed and (ii) which one of the plurality of deblocking filters should be used for the filtering, and wherein when it is detected that both of the two adjacent blocks contain an error, said determining determines that the filtering should not be performed on the boundary between the two adjacent blocks.

* * * * *